United States Patent [19]

Furuhashi et al.

[11] 4,310,888

[45] Jan. 12, 1982

[54] TECHNIQUE FOR CONTROLLING THE STARTING OPERATION OF AN ELECTRONIC ENGINE CONTROL APPARATUS

[75] Inventors: Toshio Furuhashi; Hiroastu Tokuda; Seiji Suda; Masumi Imai, all of Ibaraki, Japan

[73] Assignee: Hitachi, Ltd., Tokyo, Japan

[21] Appl. No.: 11,845

[22] Filed: Feb. 13, 1979

[30] Foreign Application Priority Data

Feb. 13, 1978 [JP] Japan ................................ 53-14101

[51] Int. Cl.[3] ...................... G05B 15/02; G06F 15/20; F02P 5/04

[52] U.S. Cl. ............................... 364/431.10; 123/417; 123/491

[58] Field of Search ....................... 364/105, 431, 442; 123/32 EA, 32 EB, 32 EC, 32 EE, 117 D, 119 A, 119 D, 417, 480, 481, 491

[56] References Cited

U.S. PATENT DOCUMENTS

| | | | |
|---|---|---|---|
| 3,816,717 | 6/1974 | Yoshida et al. | 364/105 X |
| 3,991,727 | 11/1976 | Kawai et al. | 364/431 X |
| 4,048,479 | 9/1977 | Rivere | 364/431 |
| 4,107,717 | 8/1978 | Klotzner et al. | 364/431 |
| 4,128,885 | 12/1978 | Valek et al. | 364/431 X |
| 4,142,493 | 3/1979 | Schira et al. | 364/431 X |
| 4,163,282 | 7/1979 | Yamada et al. | 364/431 |
| 4,170,040 | 10/1979 | Leblanc et al. | 364/431 X |

*Primary Examiner*—Joseph F. Ruggiero

*Attorney, Agent, or Firm*—Craig and Antonelli

[57] ABSTRACT

An electronic control apparatus for an internal combustion engine having engine parameter data sensors, an input/output unit, actuators and a data processing unit carries out a prescribed scenario for starting the engine. The starting sequence begins with the operation of a starting subsystem having a switch the state of which controls the operation of the starter motor. The starter motor is caused to be engaged and a set of initialization procedures are carried out by the data processing unit and input/output unit in dependence upon the state of the switch in the starting subsystem. These initializing procedures include engine operation control calculations as well as system preset steps. During this time, prescribed interrupts which would otherwise be delivered to the data processing unit from the input/output unit are inhibited. However, once the engine has been started, the interrupt inhibit is removed and the system operates under normal conditions.

24 Claims, 29 Drawing Figures

TECHNIQUE FOR CONTROLLING THE STARTING OPERATION OF AN ELECTRONIC ENGINE CONTROL APPARATUS

The present application relates to subject matter disclosed in the following co-pending applications:

| Inventor | U.S. Serial No. | | Filing Date |
|---|---|---|---|
| Horoastu Tokuda, et al. | 943,930 | | September 20, 1978 |
| Shigeki Morinaga, et al. | 951,509 | | October 16,1978 |
| Masao Takato, et al. | 952,275 | | October 18, 1978 |
| Horoastu Tokuda, et al. | 952,276 | | October 18, 1978 |
| Horoastu Tokuda, et al. | 952,279 | | October 18, 1978 |
| Masumi Imai, et al. | 952,326 | | October 18, 1978 |
| Masumi Imai, et al. | 952,531 | | October 18, 1978 |
| Hiroastu Tokuda, et al. | 952,532 | U.S. Pat. No. 4,274,141 | October 18, 1978 |
| Masumi Imai, et al. | 952,533 | | October 18,1978 |
| Sanshiro Obara, et al. | 059,029 | | July 19, 1979 |
| Toshio Furuhashi, et al. | 060,751 | | July 26,1979 |
| Toshio Furuhashi, et al. | 064,431 | U.S. Pat. No. 4,274,142 | August 7, 1979 |
| Masumi Imai, et al. | 073,085 | September 6, 1979 | |

This invention relates to an apparatus for controlling an internal combustion engine for use especially on an automobile.

With the continuing demand for automobiles as means of transportation, there have arisen several social problems. Among them are air pollution and consumption of fossil fuels, especially petroleum.

Some measures have been taken to reduce harmful substances in exhaust gases, but this has caused a degradation of the overall efficiency of the internal combustion engine (hereafter referred simply to as engine). For the purpose of preventing a degradation of the operating efficiency of engine and improving measures against exhaust gases, an electronic control apparatus has been employed which enjoys improved control precision. For example, there have been proposed an electronically controlled fuel injection apparatus and an electronically controlled ignition timing apparatus, and most recently an ignition apparatus controlled by a microprocessor.

The conventional trend in such a control apparatus is toward the mere replacement of mechanical control by an electric one and therefore the individual controlled objects must be provided with the associated electronic control units.

The control of an engine should suppress the harmful components in exhaust gases and operate the engine with a high efficiency. The assembly of the separate electronic control units provided for the controlled objects, e.g. the electronically controlled fuel injection apparatus and the electronically controlled ignition timing apparatus, as described above, has a poor interrelation among the control units so that a close control of the overall control system is impossible. Moreover, such a composite control system must be accompanied by extremely complicated circuits. For example, a circuit for detecting the irregular output of a sensor must be employed such an an angular position sensor.

An object of this invention is to provide a control apparatus which is a combination of comparatively simple circuits and which is capable of controlling an engine.

According to this invention, input information indicative of the operating conditions of an engine is used and processed through calculations, and plural registers are provided to hold the respective processed contents and to hold data representing the preset values. The common feature of the data held in these registers is that they are used as reference values for a comparison operation. Therefore, the registers mentioned above are referred to hereafter as reference registers constituting a reference register group and the data held in the reference registers is referred to as reference data.

On the other hand, plural registers are provided to hold data representing the instantaneous conditions of the engine and other mechanisms and these registers are referred to hereafter as instantaneous registers constituting an instantaneous register group.

This invention comprises a reference register group, an instantaneous register group, comparison circuits, an incrementor, an incrementor controller, a comparison result holding circuit and a stage counter. According to this invention, with the combination of these circuit elements, the stage counter causes the respective stages to be sequentially operated for carrying out processing operations in a predetermined order. For the particular processing operation in each stage, desired registers are successively selected from among the reference and instantaneous register groups to send the reference data and the instantaneous data from the selected registers to the associated comparison circuit. The result of the comparison, i.e. the output of the comparison circuit, is held in a comparison result holding circuit.

Concerning the stages, the instantaneous data held in each instantaneous register corresponding to a stage is rewritten according to the actually instantaneous condition of the engine or other mechanisms. The rewriting operation is controlled by the incrementor and the incrementor controller.

Namely, the incrementor controller judges if the data representing the instantaneous moments or angular positions of a crank shaft (in this specification, the term "crank shaft" is applied to the rotary shaft of not only a reciprocating engine but also a rotary engine) is increased in accordance with the instantaneous conditions of the crank angular position signal and the timing signal to give the reference unit of time. The incrementor then increases the data by a certain unit in accordance with the result of the judgement. In this way, the instantaneous data is renewed instantaneously and the renewed instantaneous data is used for actual comparison.

With this constitution, a complex control can be realized by a relatively simple circuit configuration and the pulse signals received irregularly are detected after they have been synchronized, so that the pulse signals can be accurately detected and therefore the incrementor can be operated exactly.

The above and other objects, features and advantages of the present invention will be more clear from the following description with reference to the accompanying drawings, in which:

FIG. 2 shows the detail of the control circuit shown in FIG. 1;

Figure 1:
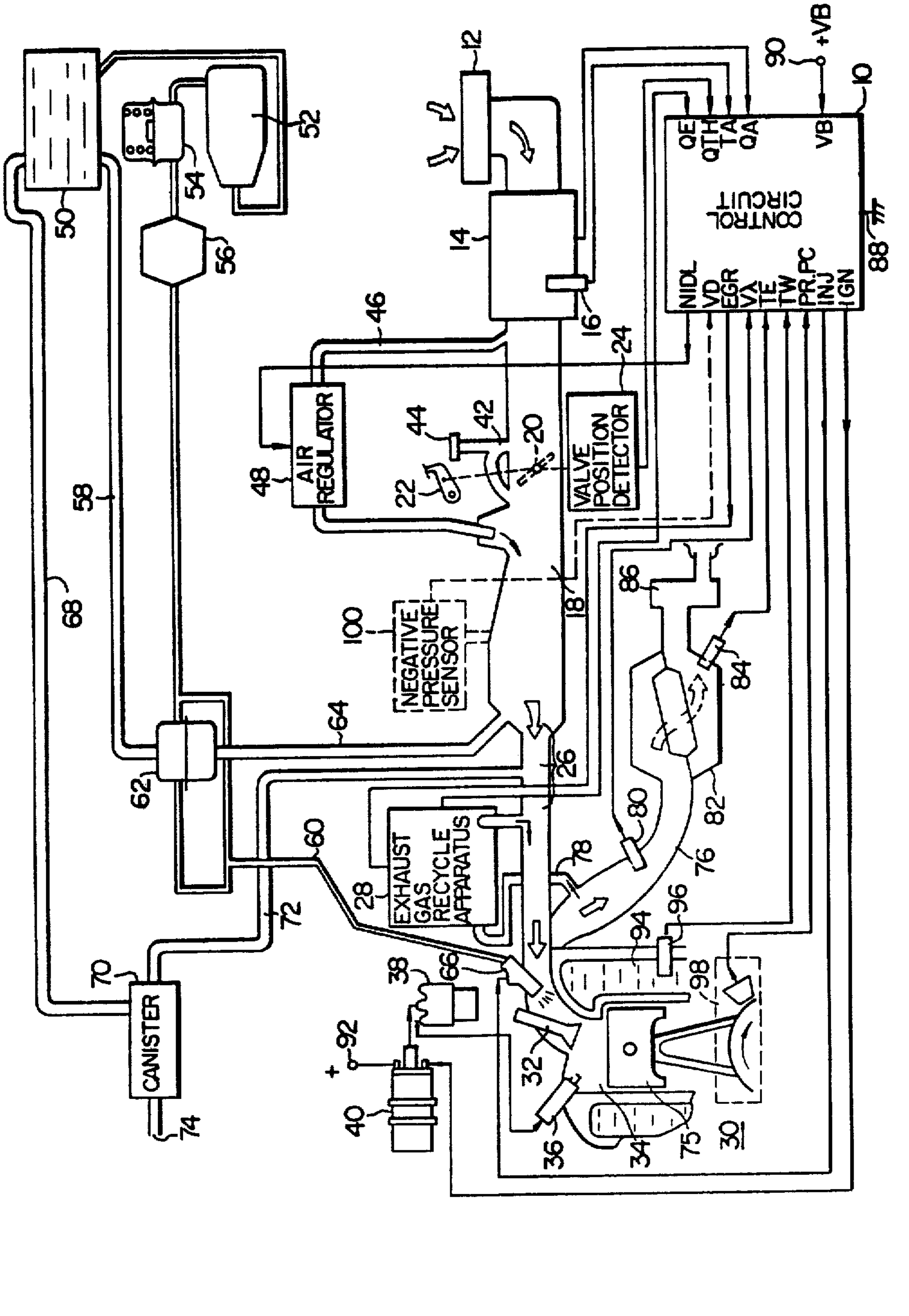
FIG. 1 shows an arrangement plan of sensors and actuators as in an embodiment of this invention.

The present invention will now be described by way of embodiment with the aid of attached drawings. FIG. 1 systematically shows the main structure of an electronic engine control apparatus. Air drawn in through an air cleaner 12 is passed through an air-flow meter 14 to measure the flow rate thereof and the air-flow-meter 14 delivers an output QA indicating the flow rate of air to a control circuit 10. A temperature sensor 16 is provided in the air-flow meter 14 so as to detect the temperature of the drawn-in air and the output TA of the sensor 16, indicating the temperature of the drawn-in air, is also supplied to the control circuit 10.

The air flowing through the air-flow meter 14 is further passed through a throttle chamber 18, an intake manifold 26 and a suction valve 32 to the combustion chamber 34 of an engine 30. The quantity of air drawn into the combustion chamber 34 is controlled by changing the aperture of a throttle valve 20 provided in the throttle chamber 18 and interlocked with an accelerator pedal 22. The aperture of the throttle valve 20 is detected by detecting the valve position of the throttle valve 20 by a throttle valve position detector 24 and the signal QTH representing the valve position of the throttle valve 20 is supplied from the throttle valve position detector 24 to the control circuit 10.

The throttle chamber 18 is provided with a bypass 42 for idling the engine and an idle adjust screw 44 for adjusting the flow of air through the bypass 42. When the throttle valve 20 is completely closed, the engine is operated in the idling condition. The sucked air past the air-flow meter flows via the bypass 42 and drawn into the combustion chamber 34. Accordingly, the flow of the air sucked in under the idling condition is changed by adjusting the idle adjust screw 44. The energy created in the combustion chamber 34 is determined substantially depending on the flow rate of the air drawn through the bypass 42 so that the rotational speed of the engine under the idling condition can be adjusted to be optimal by controlling the flow rate of air drawn into the combustion chamber by adjusting the idle adjust screw 44.

The throttle chamber 18 is also provided with another bypass 46 and an air regulator 48. The air regulator 48 controls the flow rate of the air through the bypass 46 in accordance with the output signal NIDL of the control circuit 10, so as to control the rotational speed of the engine during the warming-up operation and to properly supply air into the combustion chamber at a sudden change, especially a sudden closing, in the valve position of the throttle valve 20. The air regulator 48 can also change the flow rate of air during the idling operation.

Next, the fuel supply system will be described. Fuel stored in a fuel tank 50 is sucked out to a fuel damper 54 by means of a fuel pump 52. The fuel damper 54 absorbs the pressure undulation of the fuel supplied from the fuel pump 52 so that fuel having a constant pressure can be supplied through a fuel filter 56 to a fuel pressure regulator 62. The fuel past the fuel pressure regulator 62 is sent by pressure to a fuel injector 66 through a fuel pipe 60 and the output INJ of the control circuit 10 causes the fuel injector 66 to be actuated to inject the fuel into the intake manifold 26.

The quantity of the fuel injected by the fuel injector 66 is determined by the period during which the fuel injector 66 is opened and by the difference between the pressure of the fuel supplied to the injector and the pressure in the intake manifold 26 into which the pressurized fuel is injected. It is however preferable that the quantity of the injected fuel should depend only on the period for which the injector is opened and which is determined by the signal supplied from the control circuit 10. Accordingly, the pressure of the fuel supplied by the fuel pressure regulator 62 to the fuel injector 66 is controlled in such a manner that the difference between the pressure of the fuel supplied to the fuel injector 66 and the pressure in the intake manifold 26 is always kept constant in any driving condition. The pressure in the intake manifold 26 is applied to the fuel pressure regulator 62 through a pressure conducting pipe 64. When the pressure of the fuel in the fuel pipe 60 exceeds the pressure upon the regulator 62 by a predetermined level, the fuel pipe 60 communicates with a fuel return pipe 58 so that the excessive fuel corresponding to the excessive pressure is returned through the fuel return pipe 58 to the fuel tank 50. Thus, the difference between the pressure of the fuel in the fuel pipe 60 and the pressure in the intake manifold 26 is kept always constant.

The fuel tank 50 is also provided with a pipe 68 connected to a canister 70 provided for the suction of vaporized fuel or fuel gas. When the engine is operating, air is sucked in through an open air inlet 74 to send the fuel gas into the intake manifold 26 and therefore into the engine 30 via a pipe 72. In the case of stopped engine, the fuel gas is exhausted through active carbon filled in the canister 70.

As described above, the fuel is injected by the fuel injector 66, the suction valve 32 is opened in synchronism with the motion of a piston 75, and a mixture gas of air and fuel is sucked into the combustion chamber 34. The mixture gas is compressed and fired by the spark generated by an ignition plug 36 so that the energy created through the combustion of the mixture gas is converted to mechanical energy.

The exhaust gas produced as a result of the combustion of the mixture gas is discharged into the open air through an exhaust valve (not shown), an exhaust pipe 76, a catalytic converter 82 and a muffler 86. The exhaust pipe 76 is provided with an exhaust gas recycle pipe 78 (hereafter referred to as an EGR pipe), through which a part of the exhaust gas is fed into the intake manifold 26, that is, the part of the exhaust gas is circulated to the suction side of the engine. The quantity of the circulated exhaust gas is determined depending on the aperture of the valve of an exhaust gas recycle apparatus 28. The aperture is controlled by the output EGR of the control circuit 10 and the valve position of the apparatus 28 is converted to an electric signal QE to be supplied as an input to the control circuit 10.

A $\lambda$ sensor 80 is provided in the exhaust pipe 78 to detect the fuel-air mixture ratio of the mixture gas sucked into the combustion chamber 34. An oxygen sensor ($O_2$ sensor) is usually used as the $\lambda$ sensor 80 and detects the concentration of oxygen contained in the exhaust gas so as to generate a voltage $V_\lambda$ corresponding to the concentration of the oxygen contained in the exhaust gas. The output $V_\lambda$ of the $\lambda$ sensor 80 is supplied to the control circuit 10. The catalytic converter 82 is provided with a temperature sensor 84 for detecting the temperature of the exhaust gas in the converter 82 and the output TE of the sensor 84 corresponding to the temperature of the exhaust gas in the converter 84 is supplied to the control circuit 10.

The control circuit 10 has a negative power source terminal 88 and a positive power source terminal 90. The control circuit 10 supplies the signal IGN, for causing the ignition plug 36 to spark, to the primary winding of an ignition coil 40. As a result, a high voltage is induced in the secondary winding of the ignition coil 40 and supplied through a distributor 38 to the ignition plug 36 so that the plug 36 fires to cause the combustion of the mixture gas in the combustion chamber 34. The mechanism of the firing of the ignition plug 36 will be further detailed. The ignition coil 40 has a positive power source terminal 92 and the control circuit 10 also has a power transistor for controlling the primary current through the primary winding of the ignition coil 40. The series circuit of the primary winding of the ignition coil 40 and the power transistor is connected between the positive power source terminal 92 of the ignition coil 40 and the negative power source terminal 88 of the control circuit 10. When the power transistor is conducting, electromagnetic energy is stored in the ignition coil 40 and when the power transistor is cut off, the stored electromagnetic energy is released as a high voltage to the ignition plug 36.

The engine 30 is provided with a temperature sensor 96 for detecting the temperature of the water 94 as coolant in the water jacket and the temperature sensor 96 delivers to the control circuit 10 a signal TW corresponding to the temperature of the water 94. The engine 30 is further provided with an angular position sensor 98 for detecting the angular position of the rotary shaft of the engine and the sensor 98 generates a reference signal PR in synchronism with the rotation of the engine, e.g. every 120° of the rotation, and an angular position signal each time the engine rotates through a constant, predetermined angle (e.g. 0.5°). The reference signal PR and the angular position signal PC are both supplied to the control circuit 10.

In the system shown in FIG. 1, the air-flow meter 14 may be replaced by a negative pressure sensor. Such a negative pressure sensor 100 is depicted by dashed line and the negative pressure sensor 100 will supply to the control circuit 10 a voltage VD corresponding to the negative pressure in the intake manifold 26. A semiconductor negative pressure sensor is practically used as such a negative pressure sensor 100. One side of the silicon chip of the semiconductor is acted on by the boost pressure of the intake manifold while the atmospheric or a constant pressure is exerted on the other side of the chip. The constant pressure may be vacuum as the case may be. With this construction, a voltage VD corresponding to the pressure in the intake manifold is generated, which is to be supplied to the control circuit 10.

Figure 2:
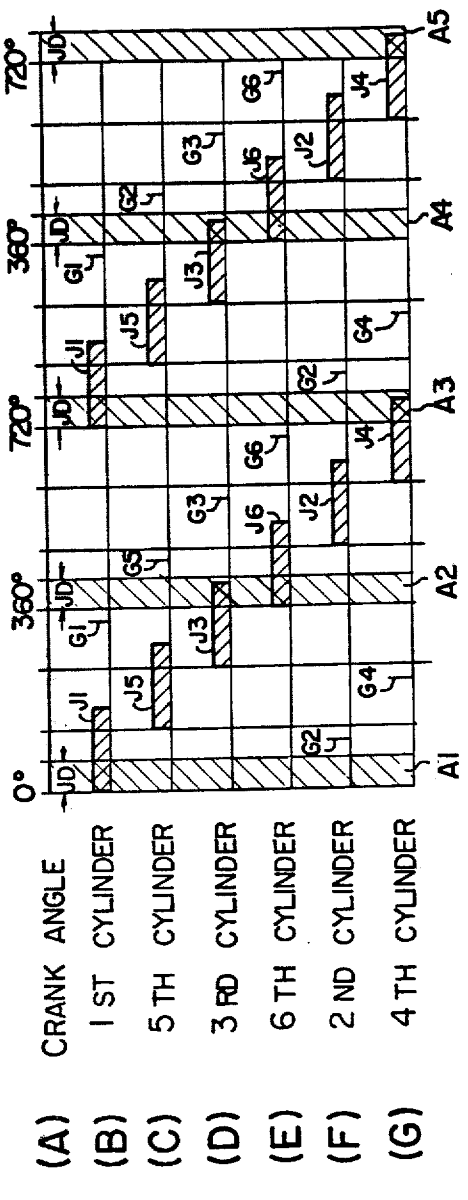
FIG. 2 is a diagram for explaining the operation of the circuits shown in FIG. 1.

FIG. 2 illustrates the relationships between the firing timing and the crank angular position and between the fuel injection timing and the crank angular position, where a six-cylinder engine is used. In FIG. 2, diagram A represents the crank angular position and indicates that a reference signal PR is delivered by the angular position sensor 98 every 120° of the crank angle. The reference signal PR is therefore supplied to the control circuit 10 at 0°, 120°, 240°, 360°, 480°, 600°, 720° etc. of the angular position of the crank shaft.

Diagrams B, C, D, E, F and G correspond respectively to the 1st cylinder, the 5th cylinder, the 3rd cylinder, the 6th cylinder, the 2nd cylinder and the 4th cylinder. $J_1$–$J_6$ designate respectively the periods for which the suction valves of the corresponding cylinders are open. The periods are shifted by 120° of crank angle from one another. The beginning and the durations of the periods at which the suction valve is open are generally as shown in FIG. 2 though somewhat different depending upon the type of engine used.

$A_1$–$A_5$ indicate the periods for which the valve of the fuel injector 66 is open, i.e. fuel injection periods. The lengths JD of the periods $A_1$–$A_5$ can be considered to be the quantities of fuel injected at a time by the fuel injectors 66. The injectors 66, provided for the respective cylinders, are connected in parallel with the drive circuit in the control circuit 10. Accordingly, the signal INJ from the control circuit 10 opens the valves of the fuel injectors 66 simultaneously so that all the fuel injectors 66 simultaneously inject fuel. Now, the first cylinder will be taken as an example for description. The output signal INJ from the control circuit 10 is applied to the fuel injectors 66 provided respectively in the manifold or inlet ports of the respective cylinders in timing with the reference signal INTIS generated at 360° of crank angle. As a result, fuel is injected in by the injector 66 for the length JD of time calculated by the control circuit 10, as shown at $A_2$ in FIG. 2. However, since the suction valve of the 1st cylinder is closed, the injected fuel at $A_2$ is not sucked into the 1st cylinder, but kept stagnant near the inlet port of the 1st cylinder. In response to the next reference signal INTIS generated at 720° of crank angle, the control circuit 10 again sends a signal to the respective fuel injectors 66 to perform the fuel injections as shown at $A_3$ in FIG. 2. Simultaneously almost with the fuel injections, the suction valve of the 1st cylinder is opened to cause the fuel injected at $A_2$ and the fuel injected at $A_3$ to be sucked into the combustion chamber of the 1st cylinder. The other cylinders will be also subjected to similar series of operations. For example, in case of the 5th cylinder corresponding to the diagram C, the fuel injected at $A_2$ and $A_3$ is sucked in at the period $J_5$ for which the suction valve of the 5th cylinder is opened. In case of the 3rd cylinder corresponding to the diagram D, a part of the fuel injected at $A_2$, the fuel injected at $A_3$ and a part of the fuel injected at $A_4$ are sucked in together while the suction valve is open for the period $J_3$. The part of the fuel injected at $A_2$ plus the part of the fuel injected at $A_4$ equals a quantity of fuel injected by a fuel injector at a single actuation. Therefore, also during the suction step of the 3rd cylinder, the quantity of fuel equal to the total quantities supplied through double actuations of the fuel injector will be sucked in. Also, in case of the 6th, 2nd or 4th cylinder as shown in the diagram E, F or G, the double quantity of fuel is sucked in during a single step of suction. As apparent from the above description, the quantity of fuel determined by the fuel injection signal INJ from the control circuit 10 is equal to half the quantity of fuel to be sucked into the combustion chamber. Namely, the necessary quantity of fuel corresponding to the quantity of air sucked into the combustion chamber 34 will be supplied through the double actuations of the fuel injector 66.

Throughout the diagrams A to G in FIG. 2, $G_1$–$G_6$ indicate the ignition, times associated respectively with the 1st to 6th cylinders. When the power transistor provided in the control circuit 10 is cut off, the primary current of the ignition coil 40 is interrupted so that a high voltage is induced across the secondary winding. The induction of the high voltage takes place in timing with the ignition epochs $G_1$, $G_5$, $G_3$, $G_6$, $G_2$ and $G_4$. The induced high voltage is distributed to the spark plugs provided in the respective cylinders by means of a distributor 38. Accordingly, the spark plugs of the 1st, 5th, 3rd, 6th, 2nd and 4th cylinders fire successively in this order to inflame the combustible mixture of fuel and air.

Figure 3:
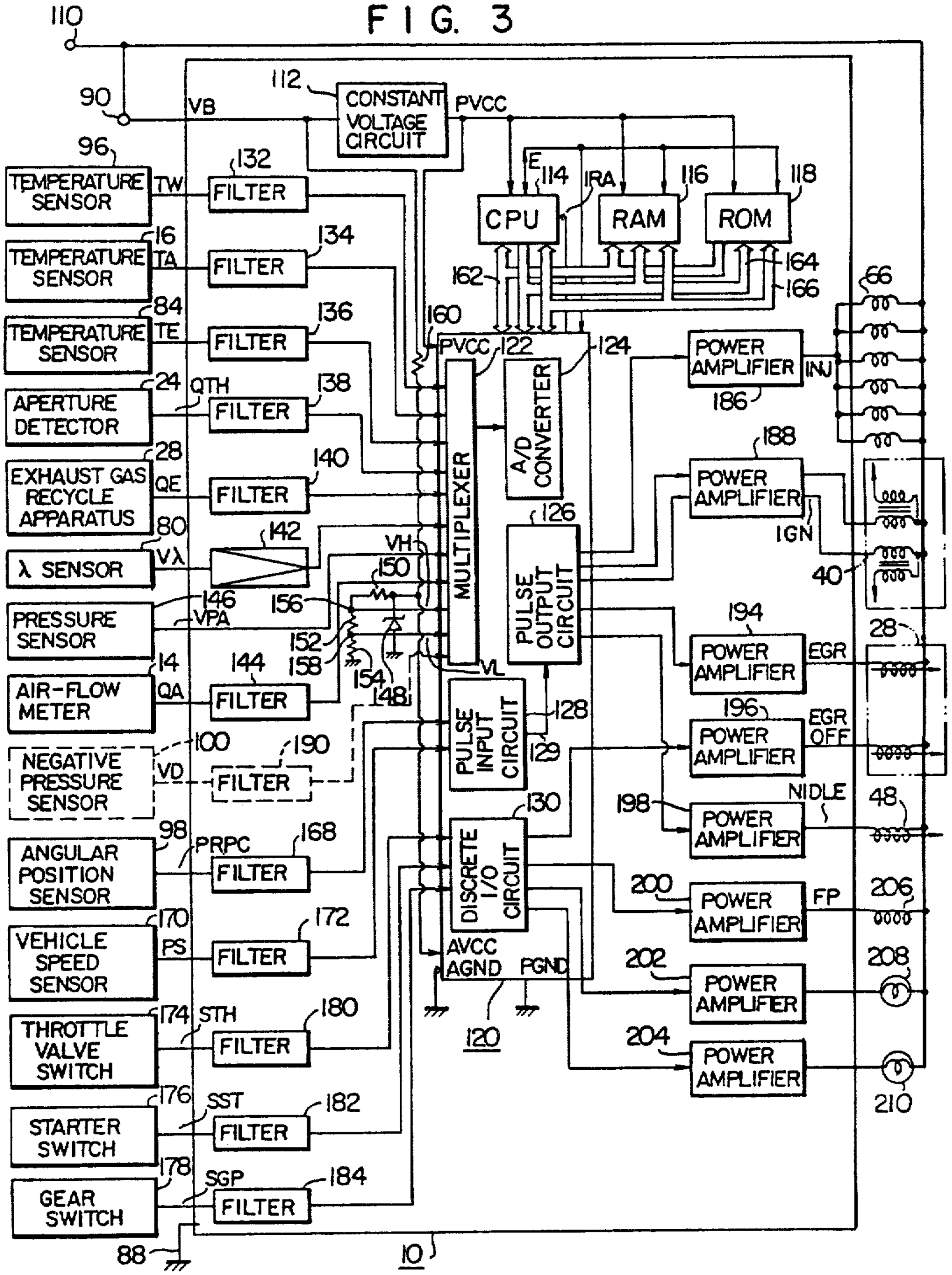

FIG. 3 shows an example of the detail of the control circuit 10 shown in FIG. 1. The positive power source terminal 90 of the control circuit 10 is connected with the positive electrode 110 of a battery to provide a voltage VB for the control circuit 10. The power source voltage VB is adjusted to a constant voltage PVCC of, for example, 5 volts by a constant voltage circuit 112. This constant voltage PVCC is applied to a central processor unit (hereafter referred to as CPU), a random access memory (hereafter referred to as RAM) and a read-only memory (hereafter referred to as ROM). The output PCVV of the constant voltage circuit 112 is supplied also to an input/output circuit 120.

The input/output circuit 120 includes therein a multiplexer 122, an analog-digital converter 124, a pulse output circuit 126, a pulse input circuit 128 and a discrete input-output circuit 130.

The multiplexer 122 receives plural analog signals, selects one of the analog signals in accordance with the instruction from the CPU, and sends the selected signal to the A/D converter 124. The analog signal inputs applied through filters 132 to 144 to the multiplexer 122 are the outputs of the various sensors shown in FIG. 1; the analog signal TW from the sensor 96 representing the temperature of the cooling water in the water jacket of the engine, the analog signal TA from the sensor 16 representing the temperature of the sucked air, the analog signal TE from the sensor 84 representing the temperature of the exhaust gas, the analog signal QTH from the throttle aperture detector 24 representing the aperture of the throttle valve 20, the analog signal QE from the exhaust recycle apparatus 28 representing the aperture of the valve of the apparatus 28, the analog signal $V_\lambda$ from the λ sensor 80 representing the air-excess rate of the sucked mixture of fuel and air, and the analog signal QA from the air-flow meter 14 representing the flow rate of air. The output $V_\lambda$ of the λ sensor 80 above is supplied through an amplifier with a filter circuit to the multiplexer 122.

The analog signal VPA from an atmospheric pressure sensor 146 representing the atmospheric pressure is also supplied to the multiplexer 122. The voltage VB is applied from the positive power source terminal 90 to a series circuit of resistors 150, 152 and 154 through a resistor 60. The series circuit of the resistors 150, 152 and 154 is shunted with a Zener diode 148 to keep the voltage across it constant. To the multiplexer 122 are applied the voltages VH and VL at the junction points 156 and 158 respectively between the resistors 150 and 152 and between the resistors 152 and 154.

The CPU 114, the RAM 116, the ROM 118 and the input/output circuit 120 are interconnected respectively by a data bus 162, an address bus 164 and a control bus 166. A clock signal E is supplied from the CPU to the RAM, ROM and input/output circuit 120 and the data transfer takes place through the data bus 162 in timing with the clock signal E.

The multiplexer 122 of the input/output circuit 120 receives as its analog inputs the cooling water temperature TW, the temperature TA of the sucked air, the temperature TE of the exhaust gas, the throttle valve aperture QTH, the quantity QE of recycle exhaust gas, the output $V_\lambda$ of the λ sensor, the atmospheric pressure VPA, the quantity QA of the sucked air and the reference voltages VH and VL. The quantity QA of the sucked air may be replaced by the negative pressure VD in the intake manifold. The CPU 114 specifies the address of each of these analog inputs through the address bus 164 in accordance with the instruction program stored in the ROM 118 and the analog input having a specified address is taken in. The analog input taken in is sent through the multiplexer 122 to the analog/digital converter 124 and the output of the converter 124, i.e. the digital-converter value, is held in the associated register. The stored value is coupled, if desired, to the CPU 114 or RAM 116 in response to the instruction sent from the CPU 114 through the control bus 166.

The pulse input circuit 128 receives as inputs a reference pulse signal PR and an angular position signal PC both in the form of a pulse train from the angular position sensor 98 through a filter 168. A pulse train of pulses PS having a repetition frequency corresponding to the speed of the vehicle is supplied from a vehicle speed sensor 170 to the pulse input circuit 128 through a filter 172. The signals processed by the CPU 114 are held in the pulse output circuit 126. The output of the pulse output circuit 126 is sent to a power amplifying circuit 186 and the fuel injector 66 is controlled by the output signal of the power amplifying circuit 186.

Power amplifying circuits 188, 194 and 198 respectively control the primary current of the ignition coil 40, the aperture of the exhaust recycle apparatus 28 and the aperture of the air regulator 48 in accordance with the output pulses of the pulse output circuit 126. The discrete input/output circuit 130 receives signals from a switch 174 for detecting the completely closed state of the throttle valve 20, from a starter switch 176, and from a gear switch 178 indicating that the transmission gear is in the top position, respectively through filters 180, 182 and 184 and holds the signals. The discrete input/output circuit 130 also receives and holds the processed signals from the central processor unit CPU 114. The discrete input/output circuit 130 treats the signals the content of each of which can be represented with a signal bit. In response to the signal from the central processor unit CPU 114, the discrete input/output circuit 130 sends signals respectively to the power amplifying circuits 196, 200, 202 and 204 so that the exhaust recycle apparatus 28 is closed to stop the recycle of exhaust gas, the fuel pump is controlled, the abnormal temperature of the catalyzer is indicated by a lamp 208 and the overheat condition of the engine is displayed by a lamp 210.

Figure 4:
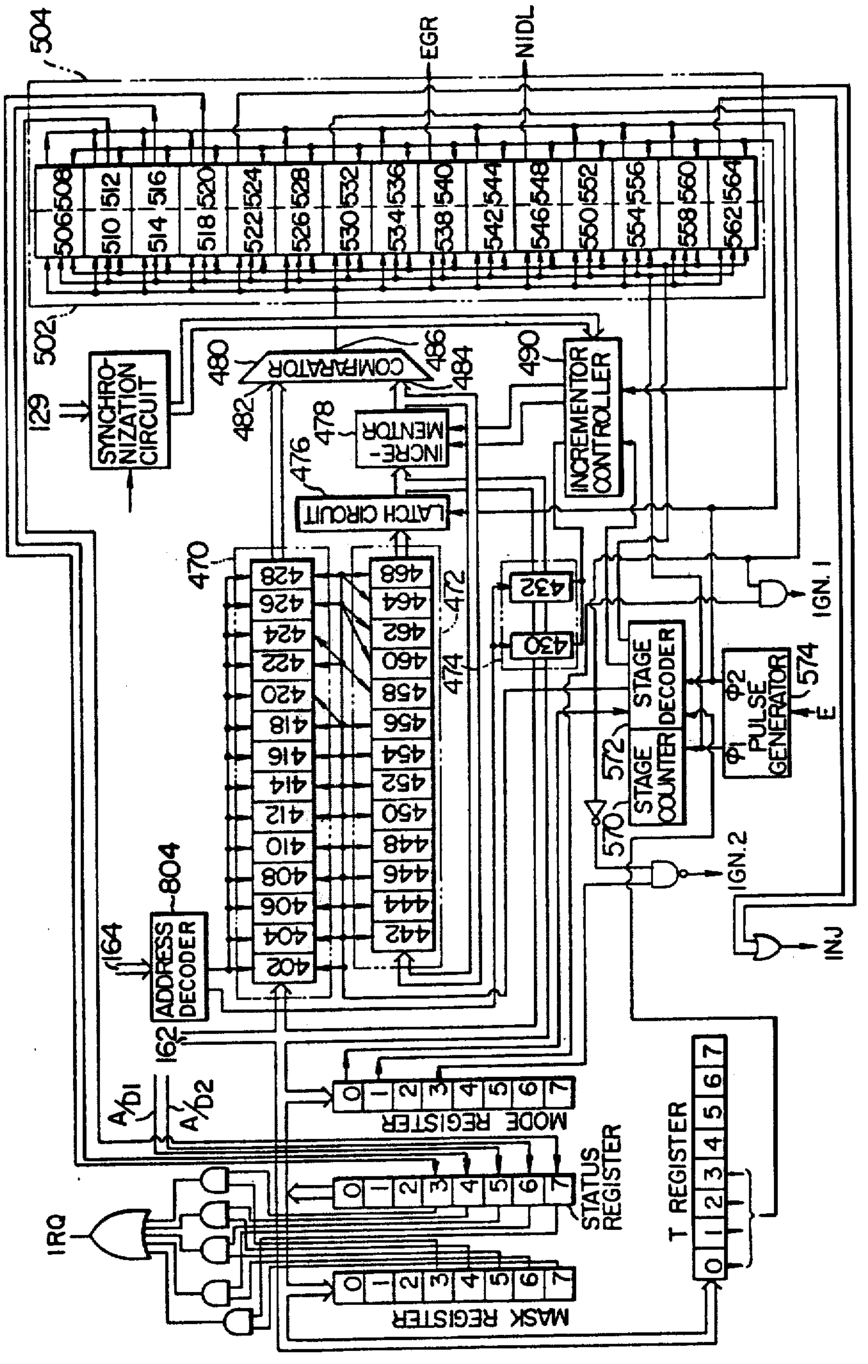
FIG. 4 shows a partial detail of the input/output circuit shown in FIG. 3.

FIG. 4 shows in detail a concrete example of the pulse output circuit 126. A register group 470 comprises reference registers which serve to hold the data processed by the CPU 114 and the data representing the predetermined fixed values. These pieces of data are transferred from the CPU 114 to the reference register group 470 through the data bus 162. Each of the registers is specified through the address bus 164 to receive and hold the associated data.

A register group 472 comprises instantaneous registers which serve to hold the instantaneous states of the engine and the associated mechanisms. The instantaneous register group 472, a latch circuit 476 and an incrementor 478 form a counter.

An output register group 474 comprises, for example, a register 430 for holding the rotational speed of the engine and a register 432 for holding the vehicle speed. The registers 430 and 432 hold the values by taking in the contents of the instantaneous registers when certain conditions are satisfied. Each register of the output register group 474 is selected by the signal sent from the CPU 114 through an address bus and the content of the selected register is sent to the CPU 114 through the data bus 162.

A comparator 480 receives, for comparison, at its input terminals 482 and 484 the reference data from selected registers of the reference register group and the instantaneous data from selected registers of the instantaneous register group. The result of the comparison by the comparator 480 is delivered at its output terminal 486. The output delivered at the output terminal 486 is set in the selected registers of a first comparison output register group 502 serving as a comparison result holding circuit, and then set in the corresponding registers of a second comparison output register group 504.

The operations of accessing, i.e. reading out of or writing in, the reference register group 470, the instantaneous register group 472 and the output register group 474, the operations of the incrementor 478 and the comparator 480, and the operations of setting the output of the comparator 480 in the first and second comparison output register groups 502 and 504 are all processed within a predetermined period of time. Other various processing operations are performed in a time sequential manner or in a time-division manner in accordance with the order of the stages instructed by a stage counter 572. In each stage, one of the registers constituting the reference register group 470, one of the registers of the instantaneous register group 472, one of the registers of the first comparison result register group 502, one of the registers of the second comparison result register group 504 and, if necessary, one of the registers of the output register groups 474 are selected. The incrementor 478 and the comparator 480 are used in common.

Figure 5:
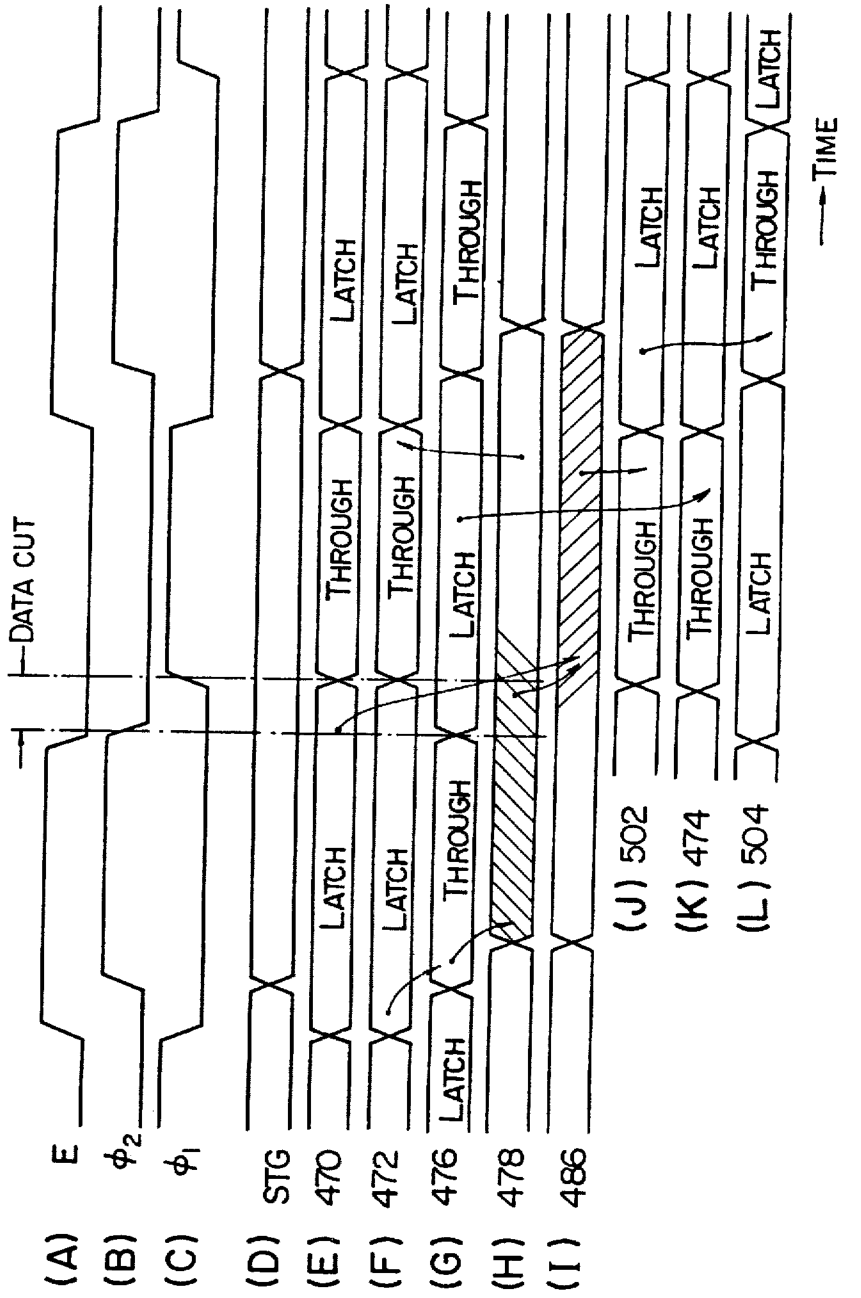
FIG. 5 is a diagram for explaining the operation of the circuit shown in FIG. 4.

FIG. 5 shows diagrams useful in explaining the operation of the circuit in FIG. 4. The clock signal E, shown in the diagram A, is supplied from the CPU 114 to the input/output circuit 120. Two clock signals $\phi 1$ and $\phi 2$, as shown in the digram B and C, having no overlap with each other are derived from the clock signal E by means of a pulse generating circuit 574. The circuit shown in FIG. 4 is operated by these clock signals $\phi 1$ and $\phi 2$.

The diagram D in FIG. 5 depicts a stage signal which is switched over during the rising transient of the clock signal $\phi 2$. The processing in each stage is performed in synchronism with the clock signal $\phi 2$. In FIG. 5, "THROUGH" indicates that the latch circuit and the register circuits are in their enabled conditions and that the outputs of these circuits depend on the inputs thereto. Also, "LATCH" means that these circuits hold certain data and that the outputs therefrom are independent of the inputs thereto.

The stage signal shown in the diagram D serves to read data out of the reference register group 470 and the instantaneous register group 472, that is, to read out the contents of certain selected registers of the groups. The diagrams E and F represent the operations of the reference and instantaneous register groups 470 and 472, respectively. These operations are performed in synchronism with the clock signal $\phi 1$.

The diagram G indicates the operation of the latch circuit 476. The latch circuit 476 is in, the THROUGH state, when the clock signal $\phi 2$ is at high level, serving to take in the content of a particular register selected from among the instantaneous register group 472. When the clock signal $\phi 2$ is at low level, on the other hand, the latch circuit 476 is in the LATCH state. Thus, the latch circuit 476 serves to hold the content of the specific register of the instantaneous register group selected in accordance with the stage assumed then. The data held in the latch circuit 476 is increased or not on the basis of external conditions by means of the incrementor 478 operated out of timing with the clock signal.

The incrementor 478 performs the following functions in response to the signal from the incrementor controller 490. The first function is the function of incrementing, to increase by unity the value of the input data. The second is the function of non-incrementing, to pass the input without any change. The third is the function of resetting, to change the entire input into data representing the value 0 (zero).

As seen from the flow of data through the instantaneous register group 472, one register of the group 472 is selected by the state counter 572 and the data held by the selected register is supplied to the comparator 480 through the latch circuit 476 and the incrementor 478.

Further, there is provided a return loop for the signal from the output of the incrementor 478 to the selected register, a complete closed loop being formed. Therefore, since the incrementor has a function of increasing the data by unity, the closed loop functions as a counter. However, if the data delivered from the particular register selected from the instantaneous register group is again received by the particular register as an input by coming back through the return loop, an erroneous operation will easily take place. The latch circuit 476 is provided to block unwanted data. Namely, the latch circuit 476 assumes the THROUGH state in timing with the clock signal $\phi 2$ while the THROUGH state in which input data is to be written in the instantaneous registers is in timing with the clock signal $\phi 1$. Therefore, data is interrupted or cut at the offset between the clock signals $\phi 1$ and $\phi 2$. Namely, even if the content of any specific register of the group 472 is changed, the output of the latch circuit 476 remains unchanged.

The comparator 480, just like the incrementor 478, operates out of timing with the clock signals. The comparator 480 receives as its inputs the data held in a register selected from among the reference register group 470 and the data held in a register selected from among the instantaneous register group 472 and sent through the latch circuit 476 and the incrementor 478. The result of the comparison of both data is set in the first comparison result register group 502 which takes the THROUGH state in timing with the clock signal $\phi 1$. The set data is further set in the second comparison result register group 504 which assumes the THROUGH state in synchronism with the clock signal $\phi 2$. The outputs of the register group 504 are the signals for controlling the various functions of the incrementor and the signals for driving the fuel injectors, the ignition coil and the exhaust gas recycle apparatus.

Also, in response to the signals, the results of the measurements of the rotational speed of the engine and the vehicle speed are transferred from the instantaneous register group 472 to the output register group 474 in every stage. For example, in the case of writing the rotational speed of the engine, a signal indicating that a preset time has elapsed, is held in the register RPMWBF 552 of the second comparison result register group 504 and the data held in the register 462 of the instantaneous register group 472 is transferred to the register 430 of the output register group 474 in response to the output of the register 552 in the RPM stage listed in the table 1 given later.

On the other hand, unless a signal indicating the elapse of the preset time is set in the register RPMWBF 552, the operation to transfer the data held in the register 462 to the register 430 never takes place even in the RPM stage.

The data held in the register 468 of the group 472 and representing the vehicle speed VSP is transferred to the output register 432 of the group 474 in response to the signal from the register VSPWBF 556 of the group 504 in the VSP stage.

The writing of the data representing the rotational speed RPM of the engine or the vehicle speed VSP in the output register group 474 is performed as follows. Reference should be had again to FIG. 5. When the stage signal STG is in the RPM or VSP mode, the data from the register 462 or 468 of the instantaneous register group 472 is written in the latch circuit 476 if the clock signal $\phi 2$ is at a high level, since the latch circuit 476 takes the THROUGH state when the clock signal $\phi 2$ is at high level. And when the clock signal $\phi 2$ is at low level, the written data is in the latched state. The thus held data is then written in the output register group 474 in timing with the high level of the clock signal $\phi 1$ in response to the signal from the register RPMWBF 552 or VSPWBF 556 since the output register group 474 assumes the THROUGH state when the clock signal $\phi 1$ is at high level, as indicated at the diagram K of FIG. 5. The written data is latched at the low level of the clock signal $\phi 1$.

In the case of reading the data held in the output register group 474 by the CPU 114, the CPU 114 first selects one of the registers 430 and 432 of the group 474 through the address bus 164 and then takes in the content of the selected register in timing with the clock signal E shown in the diagram A of FIG. 5.

Figure 6:
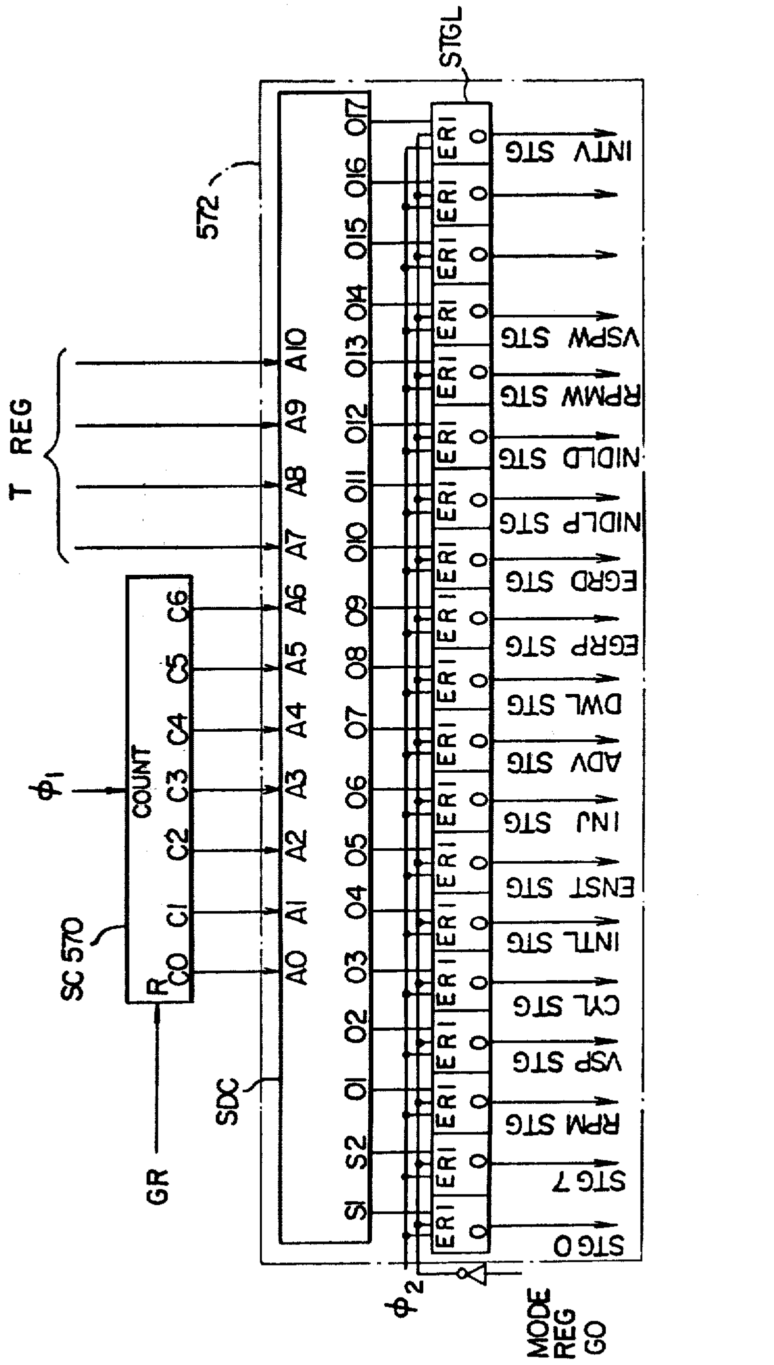
FIG. 6 shows the detail of the stage counter shown in FIG. 4.

FIG. 6 shows an example of a circuit for generating the stage signal STG shown in the diagram D of FIG. 5. The contents of a stage counter SC570 are incremented in response to the signal $\phi 1$ sent from the pulse generating circuit 574 which is per se well-known. The outputs $C_0$–$C_6$ of the stage counter SC570 and the outputs of the T register shown in FIG. 4 are supplied as inputs to a stage decoder SDC. The stage decoder SDC delivers as its outputs signals 01–017 and the signals 01–017 are written in a stage latch circuit STGL in timing with the clock signal $\phi 2$.

The reset input terminal of the stage latch circuit STGL receives a signal GO of bit $2^0$ from the mode register shown in FIG. 4 and when the signal GO of bit $2^0$ takes its low level, all the outputs of the stage latch circuit STGL are at the low level to stop all the processing operations. If, on the other hand, the signal GO resumes the high level, the stage signals STG are successively delivered again in the predetermined order to perform the corresponding processings.

The above stage decoder SDC can be easily realized by the use of, for example, a ROM (read-only memory). The table 1 given below lists up the details of the contents 00–7F of the stage signals STG delivered as outputs from the stage latch circuit STGL.

TABLE 1

(Hexadecimal).

| | $C_3$–$C_6$ | | | | | | | |
|---|---|---|---|---|---|---|---|---|
| $C_0$–$C_2$ | 0 | 1 | 2 | 3 | 4 | 5 | 6 | 7 |
| 0 | EGRP | NIDLP | — | RPMW | ENST | — | — | — |
| 1 | INTL | INTL | INTL | INTL | INTL | INTL | INTL | INTL |
| 2 | CYL | CYL | CYL | CYL | CYL | CYL | CYL | CYL |
| 3 | ADV | ADV | ADV | ADV | ADV | ADV | ADV | ADV |
| 4 | DWL | DWL | DWL | DWL | DWL | DWL | DWL | DWL |
| 5 | VSP | VSP | VSP | VSP | VSP | VSP | VSP | VSP |
| 6 | RPM | RPM | RPM | RPM | RPM | RPM | RPM | RPM |
| 7 | INJ | INJ | INJ | INJ | INJ | INJ | INJ | INJ |

$C_3$–$C_6$

TABLE 1-continued

| $C_0$–$C_2$ | 8 | 9 | A | B | C | D | E | F |
|---|---|---|---|---|---|---|---|---|
| 0 | EGRD | NIDLD | — | VSPW | INTV | — | — | — |
| 1 | INTL | INTL | INTL | INTL | INTL | INTL | INTL | INTL |
| 2 | CYL | CYL | CYL | CYL | CYL | CYL | CYL | CYL |
| 3 | ADV | ADV | ADV | ADV | ADV | ADV | ADV | ADV |
| 4 | DWL | DWL | DWL | DWL | DWL | DWL | DWL | DWL |
| 5 | VSP | VSP | VSP | VSP | VSP | VSP | VSP | VSP |
| 6 | RPM | RPM | RPM | RPM | RPM | RPM | RPM | RPM |
| 7 | INJ | INJ | INJ | INJ | INJ | INJ | INJ | INJ |

First, a general reset signal GR is received at the reset terminal R of the stage counter SC570 shown in FIG. 6 so that all the outputs $C_0$–$C_6$ of the stage counter SC570 become "0" (zero). The general reset signal is delivered from the CPU at the time of starting the control circuit 10. Under the above condition, if the clock signal $\phi 2$ is received, a stage signal EGRPSTG is delivered in timing with the rising transient of the signal $\phi 2$. According to the stage signal EGRPSTG, a processing EGRP is performed. Upon reception of a pulse of the clock signal $\phi 1$, the stage counter SC570 counts up to increase its content by unity and then the arrival of the clock signal $\phi 2$ causes the next stage signal INTLSTG to be delivered. A processing INTL is performed according to the stage signal INTLSTG. Thereafter, a stage signal CYLSTG is delivered for the execution of a processing CYL and then a stage signal ADVSTG for a processing ADV. In like manner, as the stage counter SC570 continues to count up in timing with the clock signal $\phi 1$, other stage signals STG are delivered in timing with the clock signal $\phi 2$ and the processings according to the stage signals STG are executed.

When all the outputs $C_0$–$C_6$ of the stage counter SC570 become "1", a stage signal INJSTG is delivered for the execution of a processing INJ, which terminates the whole processings listed in the above table 1. Upon reception of the next clock signal $\phi 1$, all the outputs $C_0$–$C_6$ of the stage counter SC570 becomes zero and the stage signal EGRPSTG is delivered again for the execution of the processing EGRP. In this way, the processings listed in the table 1 will be repeated.

The processings in the respective stages, listed in the table 1 will be detailed in the following table 2.

TABLE 2

| Stage Signal | Type of Processing Operation Corresponding to Stage Signal |
|---|---|
| EGRPSTG | to determine whether or not the period of time determined by the data held in the register 418 has elapsed, so as to determine the period of the pulse current for driving the valve of the exhaust gas recycle apparatus. |
| INTLSTG | to determine whether or not the engine has rotated through an angle corresponding to the data held in the register 406, on the basis of the reference signal PR from the angular position sensor, so as to generate a reference signal INTLS. |
| CYLSTG | to determine whether or not the reference signals INTLS represented by the data held in the register 404 have been generated, so as to generate a signal CYL indicating a single rotation of the crank shaft. |
| ADVSTG | to determine whether or not the engine has rotated through an angle corresponding to the data held in the register 414, on the basis of the reference signal, so as to generate an ignition timing signal. |
| DWLSTG | to determine whether or not the engine has rotated through an angle corresponding to the data held in the register 416, after the generation of the immediately previous |

TABLE 2-continued

| Stage Signal | Type of Processing Operation Corresponding to Stage Signal |
|---|---|
| | reference signal, so as to generate a signal indicating the initial conduction point of the primary current through the ignition coil. |
| VSPSTG | to hold, for detecting the vehicle speed, the data corresponding to the actually measured vehicle speed in the output register when the lapse of a predetermined period of time is ascertained on the basis of the signal (output of VSPWBF) representing the lapse of the predetermined period of time and to continue to further count the vehicle speed pulses when the predetermined period of time has not yet elapsed. |
| RPMSTG | to hold, for detecting the rotational speed of the engine, the data corresponding to the actually measured vehicle speed in the output register when the lapse of a predetermined period of time is ascertained on the basis of the signal (output of RPMBF) representing the lapse of the predetermined period of time and to continue to further count the angular position signals when the predetermined period of time has not yet lapsed. |
| INJSTG | to determine whether or not the time corresponding to the data held in the register 412 has lapsed, on the basis of the signal CYL, so as to produce a signal INJ representing the valve opening period for the fuel injector. |
| NIDLPSTG | to determine whether or not the time corresponding to the data held in the register 422 has lapsed, so as to determine the period of the pulse current for driving the air regulator. |
| RPMWSTG | to determine whether or not a predetermined period of time for which the pulses synchronous with the rotation of the engine are to be counted has elapsed, so as to measure the rotational speed of the engine. |
| ENSTSTG | to detect the condition that there is no signal delivered from the angular position sensor for a preset period of time, so as to detect an accidental stopping of engine. |
| EGRDSTG | to determine whether or not the duration of the pulse of the pulse current for driving the valve of the exhaust gas recycle apparatus has become coincident with the value corresponding to the data held in the register 420. |
| NIDLDSTG | to determine whether or not the pulse duration of the pulse current for driving the air regulator has become coincident with the value corresponding to the data held in the register 424. |
| VSPWSTG | to determine whether or not a preset period of time for which the pulses synchronous with the vehicle speed are to be counted has lapsed, so as to measure the vehicle speed. |
| INTVSTG | to determine whether or not the period of time corresponding to the data held in the register 408 has elapsed. |

In the stage latch circuit STGL shown in FIG. 6, the circuit components associated with the output signals STG0 and STG7 serve to synchronize externally supplied signals with the clock signal produced in the input/output circuit 120. The output STG0 is delivered when all the outputs $C_0$–$C_2$ of the stage counter SC570 are zero "0" while the output STG7 is delivered when all the outputs $C_0$–$C_2$ are one "1".

Examples of the external signals are the reference signal PR generated in timing with the rotation of the engine, the angular position signal and the vehicle speed pulse signal PS generated in synchronism with the rotation of the wheel. The periods of these signals, which are pulse signals, vary to a considerable extent and therefore the signals, if not controlled, are by no means synchronous with the clock signals $\phi 1$ and $\phi 2$. Accordingly, there is no determination of whether the increment operation is performed or not, in the stage ADVSTG, VSPSTG or RPMSIG in the table 1.

It is therefore necessary to synchronize the external pulse signal, for example, a sensor and the stage of the input/output circuit. For the improvement in the detection accuracy, the angular position signal PC and the vehicle speed signal PS must have their rising and falling transient synchronized with the stage while the reference signal PR must have its rising edge synchronized with the stage.

Figure 7:
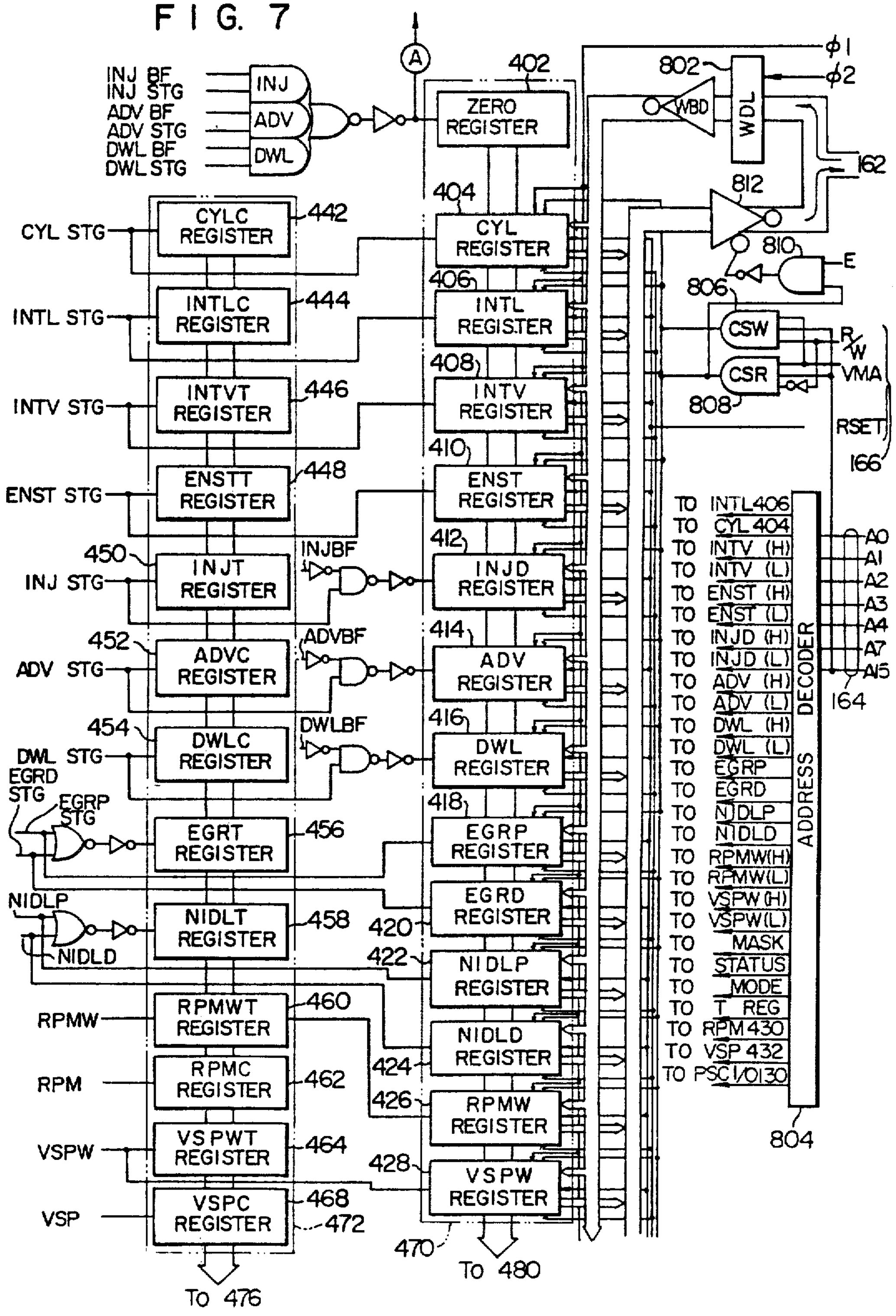
FIG. 7 shows in detail concrete examples of the reference and the instantaneous register groups shown in FIG. 4.

FIG. 7 shows the details of the register groups 470 and 472.

First, the input of data to the reference register group will be described. Input data is supplied to a latch circuit 802 through the data bus 162. Simultaneously, a read/write signal R/W and a signal VMA are supplied from the CPU through the control bus 166. The registers in the input/output circuit are selected through the address bus 164. As is well known, a technique of selecting the registers is to decode the data sent through the address bus into the signals corresponding to the respective registers and the decoding is effected by an Address Decoder 804. The outputs of the decoder 804 are connected with the registers specified by the symbols labeled at the respective outputs (wiring is omitted). In accordance with the above mentioned read/write signal R/W, signal VMA and the address bus bit A15 corresponding to the input/output circuit, the select chip write and the select chip read signals CSW and CSR are sent through gates 806 and 808 respectively.

In the case of the writing of the data from the CPU, the select chip write signal CSW is delivered and applied to the input side of the registers. Now, the select chip read signal CSR is not delivered and therefore the gate 810 is closed and the tri-state buffer 812 is closed.

The data sent through the data bus 162 is latched by the latch circuit WDL 802 in timing with the clock signal $\phi 2$. The data latched in the latch circuit 802 is transferred through the write bus driver WBD to the respective registers of the reference register group 470 and written in the registers selected by the address decoder in timing with the signal $\phi 1$. The registers 408, 410, 412, 414, 416, 426 and 428 of the group 470 have 10 bits each and both the CPU and the data bus are designed to treat data of 8 bits, so that the upper two bits and the lower eight bits of the ten-bit data are given two different addresses. Accordingly, the transfer of data to the 10-bit register takes place twice per data.

On the other hand, the reading process is contrary to this. The chip select gate 808 is selected by the output sent through the control bus and the buffer 812 is opened by the output of the gate 810 in timing with the signal E. Since at this time a desired register is selected by the address signal sent through the address bus 164, the data in the selected register is delivered through the tri-state (three-state) buffer 812 onto the data bus 162.

Next, description will be made of the operation to select the reference register and the instantaneous register in accordance with the stage signal. The reference and instantaneous register groups 470 and 472 receive the stage signals. In response to the stage signals, the corresponding registers are selected in the respective stages. Of the reference register group 470, the registers 412, 414 and 416 do not receive the stage signals and therefore are not selected, when the corresponding outputs INJBF, ADVBF and DWLBF are delivered from the comparison result holding register group 504. Instead, when the signals INJBF, ADVBF and DWLBF are received, the zero register 402 is selected in the stages INJ, ADV and DWL. Concerning the instantaneous register group 472, the register 456 receives the stage signals EGRP and EGRD and the register 458 receives the stage signals NIDLP and NIDLD. Thus, the register 456 is selected together with the reference register 418 or 420 in the stage EGRPSTG or EGRDSTG, respectively. And the register 458 is selected together with the reference register 422 or 424 in the stage NIDLPSTG or NIDLDSTG, respectively.

Figure 8:
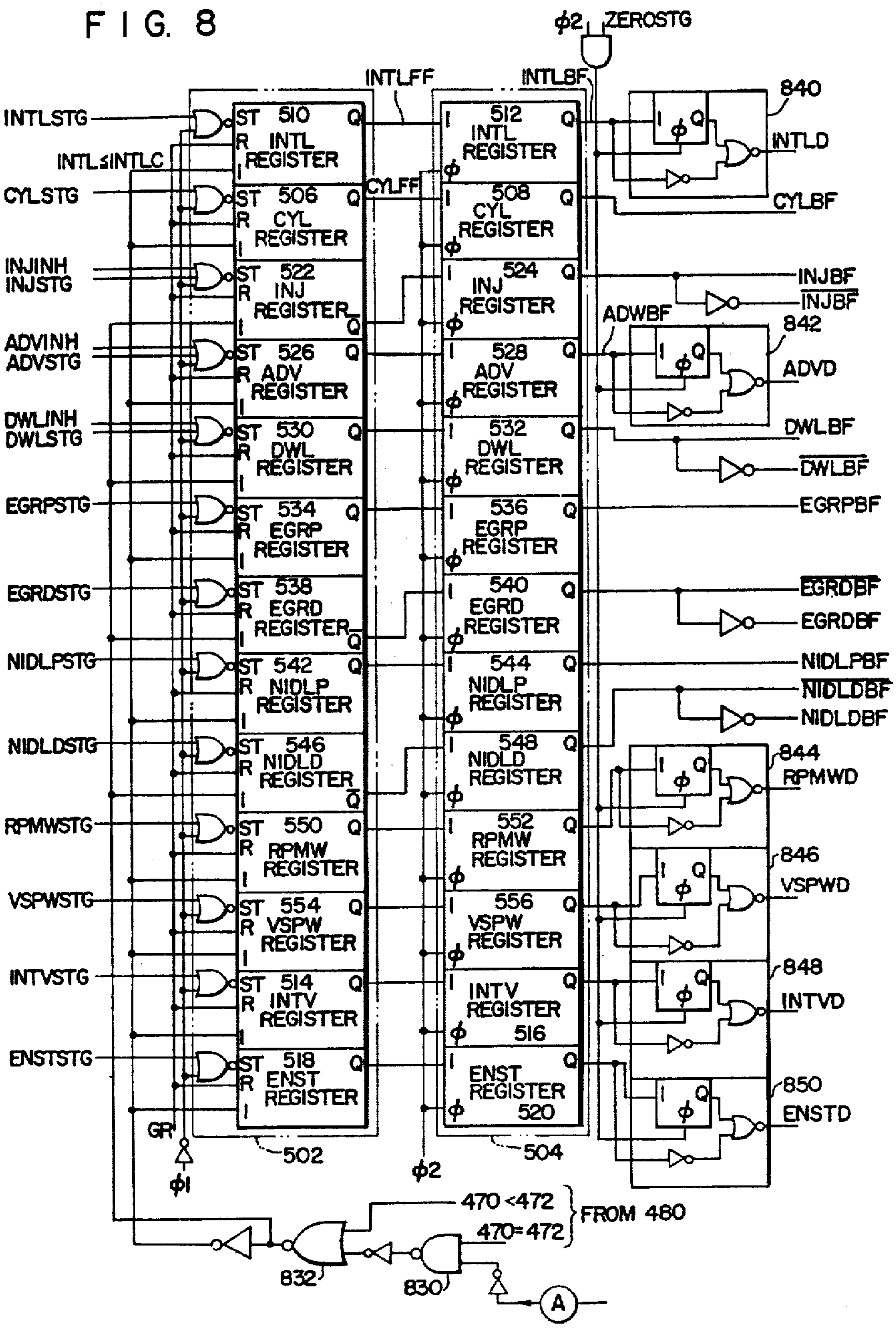
FIG. 8 shows in detail concrete examples of the first and the second comparison output register groups 502 and 504.

FIG. 8 shows in detail the first and second comparison output register groups 502 and 504 shown in FIG. 4. The output of the comparator 480 is divided into a signal indicating an EQUAL condition and a signal indicating a LARGER condition and both the signals are sent to the NOR gate 832. Accordingly, the output of the NOR gate 832 indicates an EQUAL or LARGER condition. Since the NAND gate 830 receives the EQUAL signal from the comparator 480 and the signal for selecting the ZERO register 402, the signal indicating the EQUAL condition is blocked by the NAND gate 830 is the ZERO register 402 is selected. As a result, the output of the NOR gate 832 is only the signal indicating the LARGER condition. It is necessary to select the respective registers of the first comparison output register group 502 in timing with the respective registers of the reference and instantaneous register groups. Therefore, the registers of the group 502 receives the clock signal $\phi 1$ and the corresponding stage signals to be set in synchronism with the corresponding reference and instantaneous registers. As a result, the result of comparison made in each stage is latched in the associated register of the first comparison output register group in timing with the clock signal $\phi 1$. Since the second comparison output register group 504 receives the clock signal $\phi 2$ for its set timing, the above result of comparison is set in the second comparison output register group in timing with the clock signal $\phi 2$ delayed with respect to the clock signal $\phi 1$. Then, the registers of the group 504 deliver their respective BF outputs.

The registers 512, 528, 552, 556, 516 and 520 of the second comparison output register group 504 are provided respectively with the waveform shaping circuits 840, 832, 844, 846, 848 and 850, which respectively deliver pulses INTLD, ADVD, RPMWD, VSPWD, INTVD and ENSTD performing their duties only during the period from the instant that the register group 504 is set to the next arrival of the stage signal ZEROSTG.

For the purpose of detecting the pulse train signals supplied from the various sensors to the input/output circuit, it is necessary to synchronize these pulse train signals with the operation of the input/output circuit. For, since the periods or the pulse durations of these pulse train signals vary depending on, for example, the rotational speed of the engine and the vehicle speed to considerable extents, each lengthened period may equal several times the period of the corresponding stage while each shortened period may be too short in comparison with that of the corresponding stage to exist until the corresponding stage signal is received. Therefore, if these pulse train signals are not suitably controlled, the exact counting of the pulse trains will be impossible.

Figure 9:
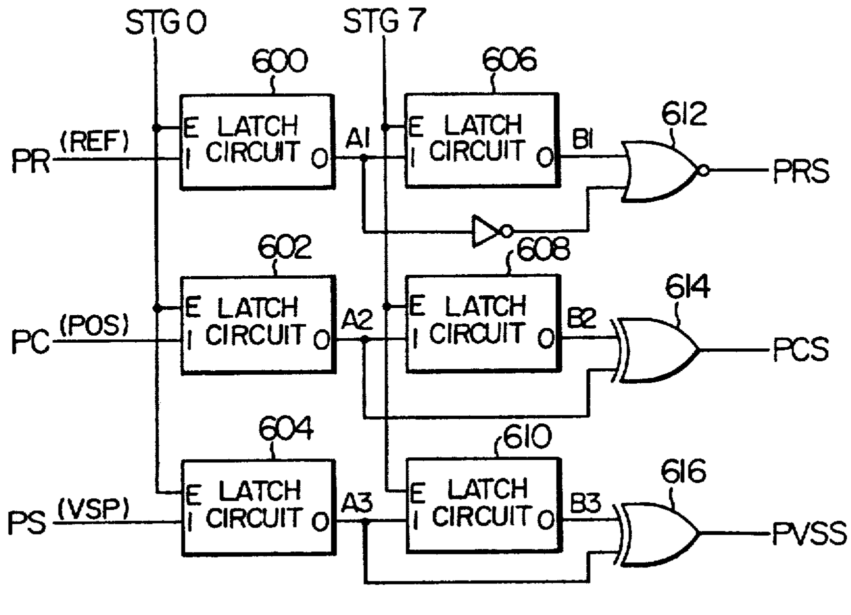
FIG. 9 shows in detail a synchronizing circuit.
Figure 10:
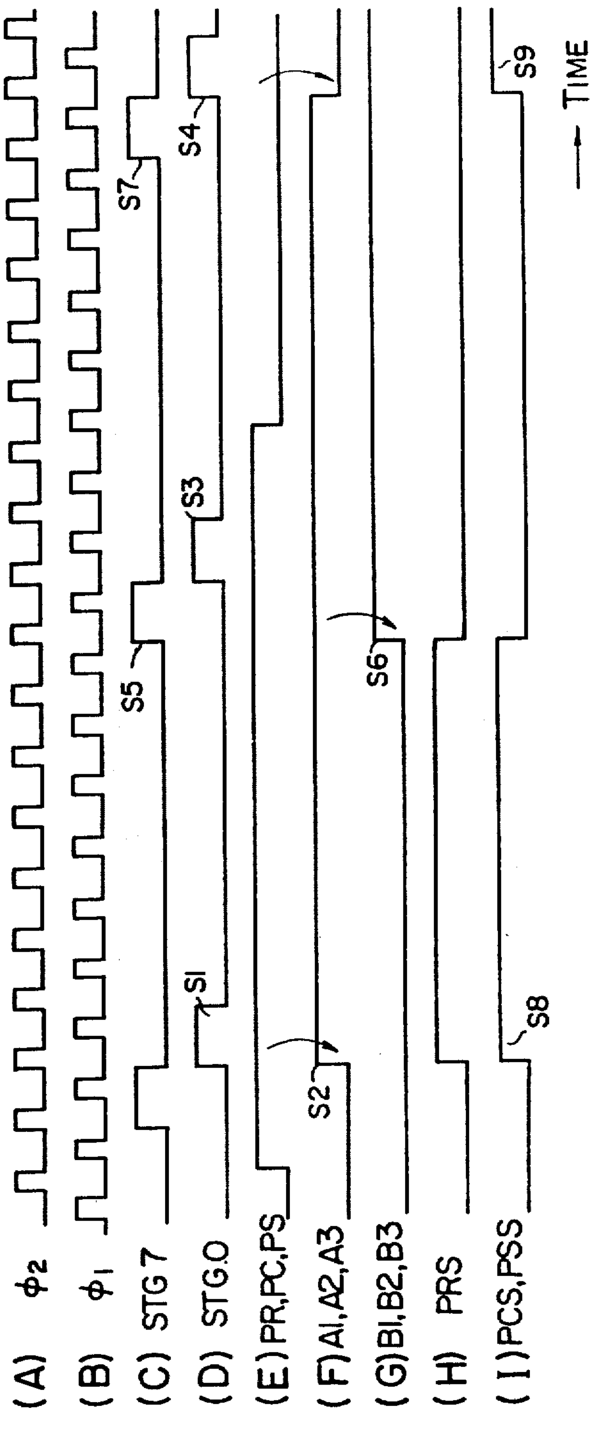
FIG. 10 is a diagram for explaining the operation of the circuit shown in FIG. 9.

FIG. 9 shows an example of a synchronizing circuit for synchronizing the external pulse train signals with the stage signals in the input/output circuit and FIG. 10 shows a timing chart useful in explaining the operation of the synchronizing circuit shown in FIG. 9.

The external input pulse signals from the various sensors, such as the reference pulses PR, the angular position signal PC and the vehicle speed signal PS are latched respectively in the latch circuits 600, 602, 604 in response to the output STG0 shown in FIG. 6.

In FIG. 10, the diagram A corresponds to the waveform of the clock signal $\phi 2$, B to the clock signal $\phi 1$, and C and D to the stage signals STG7 and STG0. These stage signals are generated in timing with the clock signal $\phi 2$. The signal waveform of the diagram E is of the output pulse from the angular position sensor or the vehicle speed sensor, corresponding to the reference pulse PR or the angular position pulse PC or the vehicle speed pulse PS. The time of occurrence, the duty cycle and the period of the signal shown in the diagram E are irregular, the signal being received independent of the corresponding stage signal.

Now, let it be assumed that the signal as shown in the diagram E is received by the latch circuits 600, 602 and 604. Then, they are latched in response to the stage signal STG0 (pulse S1 in diagram D). Accordingly, the outputs A1, A2 and A3 take the high level at an instant S2, as shown in diagram F. Also, since the input signals PR, PC and PS are at the high level when the stage signal STG0 represented by the pulse S3 is received, the high level is latched in the latch circuits 600, 602 and 604. On the other hand, since the input signals PR, PC and PS are at the low level when the stage signal STG0 represented by the pulse S4 is received, the low level is latched in the latch circuits 600, 602 and 604. As a result, the outputs A1, A2 and A3 of the latch circuits 600, 602 and 604 are as shown in the diagram F of FIG. 10. Since the latch circuits 606, 608 and 610 respectively latch the outputs A1, A2 and A3 of the latch circuits 600, 602 and 604 in response to the stage signal STG7 represented by the pulse S5 shown in the diagram C, the outputs B1, B2 and B3 of the latch circuits 606, 608 and 610 rise at the instant S6. Also, since they latch the high level when the stage signal STG7 represented by the pulse S7 is received, they continue to deliver the high level output. Therefore, the output signals B1, B2 and B3 of the latch circuit 606, 608 and 610 are as shown in the diagram G of FIG. 10.

The NOR circuit 612 receives the signal B1 and the inverted version of the signal A1 through the inverter 608 and delivers the synchronized reference signal PRS as shown in the diagram H of FIG. 10. This synchronized reference signal PRS is generated in response to the leading edge of the stage signal STG0 under the condition that the reference signal PR has changed from a low level to a high level and disappears in response to the leading edge of the stage signal STG7 and so has a pulse duration from the leading edge of the stage signal STG0 to the leading edge of the stage signal STG7. The exclusive OR circuits 614 and 616 receive the signals A2 and B2 and the signals A3 and B3. The signal S8 is generated in response to the leading edge of the stage signal STG0 when the stage signal STG0 is generated after the signal PC or PS is changed from a low to a high level and disappears in response to the leading edge of the stage signal STG7, while the signal S9 is generated in response to the leading edge of the stage signal STG0 when the signal STG0 is generated after the signal PC or PS is changed from a high to a low level and disappears in response to the leading edge of the stage signal STG7. The duty cycles of the signals S8 and S9 are equal to that of the signal shown in the diagram H of FIG. 10, and therefore determined by the stage signals STG0 and STG7.

In the above description, it is assumed that the signals PR, PC and PS has the same duty cycle and that they are simultaneously received. In practice, however, they have different duty cycles and are received at different instants. Further, each signal itself has its period and duty cycle varied with time.

The synchronizing circuit shown in FIG. 9 serves to render the irregular duration of the signal constant. The constant pulse duration is determined by the difference between the rising instants of the stage signals STG0 and STG7. Therefore, the pulse widths or durations can be controlled by controlling the stage signals supplied to the latch circuits 600, 602, 604, 606, 608 and 610.

The pulse durations are determined depending on the timing of the stages listed in the table 1. Namely, as seen from the table 1, the stage INTL corresponds to the condition that the outputs of the counters $C_0$–$C_2$ and the outputs of the counters $C_3$–$C_6$ are respectively 1 and 0, i.e. ($C_0$–$C_2$, $C_3$–$C_6$)=(1, 0) and further the conditions that ($C_0$–$C_2$, $C_3$–$C_6$)=(1, 1), (1, 2), (1, 3) . . ., thus the stage INTL appears every eighth stage.

Since each stage is processed in 1 $\mu$sec, the stage INTL appears every 8 $\mu$sec. In the stage INTL, the angular position signal PC must be detected to control the incrementor and when the output PC of the angular position sensor 98 is supplied to the synchronizing circuit shown in FIG. 9, the circuit generates the synchronizing pulses which coincide in timing with the stage INTL so that the incrementor controller is controlled by the synchronizing pulses PCS in the stage INTL.

The synchronizing pulse signal PCS is detected also in the stage ADV or RPM. The stage ADV or RPM appears whenever each of the values of the outputs $C_3$–$C_6$ is incremented by unity while each of the values of the outputs $C_0$–$C_2$ is 3 or 6, respectively. Each of the stages ADV and RPM reappears at a period of 8 $\mu$sec.

The signal STG0 shown in FIG. 9 is delivered when the values of the outputs $C_0$–$C_2$ of the stage counter SC570 are 0 while the signal STG7 is delivered when the bits $C_0$–$C_2$ have a decimal value of 7. The stage signals STF0 and STF7 are generated independent of the outputs $C_3$–$C_6$. As seen from FIG. 10, the synchronized signal PCS necessarily has its pulse duration existing while the outputs $C_0$–$C_2$ of the stage counter change from 0 to 6. The incrementor controller is controlled by detecting the signal in the stages INTL, ADV and RPM.

In like manner, the stage CVL for detecting the synchronized reference signal PRS takes place when the outputs $C_0$–$C_2$ of the stage counter SC570 are 2. When the angular position sensor 98 delivers the reference pulse PR, it is necessary to deliver the synchronized reference signal PRS when the outputs $C_0$–$C_2$ are 2. This requirement is satisfied by the circuit shown in FIG. 9 since the circuit delivers the pulse signal whose pulse duration lasts from the stage signal STG0 to the stage signal STG7.

The stage VSP for detecting the vehicle speed takes place only when the outputs $C_0$–$C_2$ of the stage counter are 5. It is therefore only necessary to deliver the synchronized signal PSS while the outputs $C_0$–$C_2$ are 5. This requirement is also satisfied by the circuit shown in FIG. 9 since with the circuit the outputs $C_0$–$C_2$ have the values from 0 to 6. In the circuit shown in FIG. 9, the stage signals STG0 and STG7 may be replaced respectively by the stage signal STG4 delivered when the outputs $C_0$–$C_2$ have the value of 4 and the stage signal STG6 delivered when the outputs $C_0$–$C_2$ are 6. In this case, if the signal PS is received, the synchronized signal PSS is always delivered when the outputs $C_0$–$C_2$ are 4 and 5.

Now, the cycles of the stages will be referred to. As shown in the above given table 1, 128 stage signals are produced corresponding to the values 0–127 of the outputs $C_0$–$C_6$ of the stage counter SC570. When all these 128 stage signals have been generated, a major cycle is completed to be followed by a next major cycle. Each major cycle is constituted of 16 minor cycles and each minor cycle consists of 8 stage signals. The minor cycle corresponds to the values 0 to 7 of the outputs $C_0$–$C_2$ of the stage counter and is finished in 8 μsec.

To exactly synchronize the pulse signals PR, PC and PS and to exactly generate the synchronized pulses PRS, PCS and PSS, it is necessary for the outputs of the sensors to have a pulse duration longer than the period of the minor cycle. For example, the duration of the angular position pulse PC is shortened as the rotational speed of engine increases. It is about 9 μsec. for 9000 rpm. It is therefore necessary to make the period of the minor cycle shorter than 9 μsec. so as to exactly perform the synchronizing operation even at 9000 rpm. In this embodiment, the period of the minor cycle is chosen to be 8 μsec.

Figure 11:
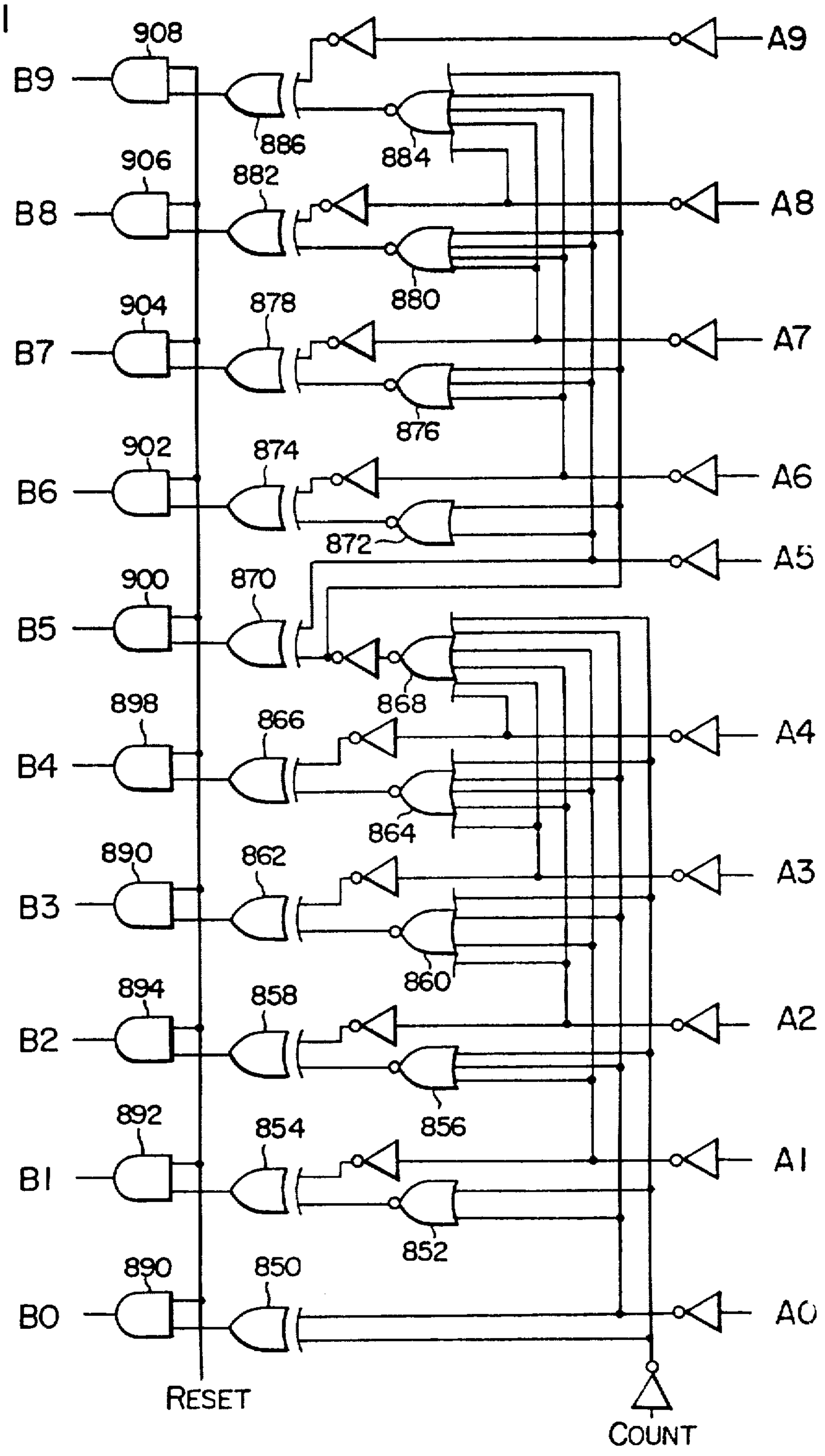
FIG. 11 shows in detail a concrete example of the incrementor 478 shown in FIG. 4.

FIG. 11 shows in detail an example of the incrementor 478 shown in FIG. 4. The input terminals A0–A9 respectively receive the 10-bit data from one of the registers of the instantaneous register group, selected in accordance with the corresponding stage signal.

First, description will be made of the bit A0. i.e. signal received at the input terminal A0. The bit A0 and the count signal is supplied to the exclusive OR circuit 850. If the bit A0 is 0 (zero) and the count signal has the zero (L) level, then the signal 0 (zero) is delivered by the circuit 850. On the other hand, if the bit A0 is 1 and the count signal is the L level, the value 1 is delivered. Namely, when the count signal is 0, the bit A0 is passed without any change.

If the count signal has the 1(H) level, the bit A0 is inverted; the output of the circuit 850 is 0 when the bit A0 is 1 and when the bit A0 is 0. With respect to the bit A0, the value is counted up by unity in accordance with the count signal. When the bit A0 and the level of the count signal are both 1, a carry signal is supplied to the processing gate 854 for the upper bit A1.

The NOR gate 852 serves to detect the above said carry signal and only when there is the carry signal, the bit A1 is inverted to be delivered as an output B1. When there is no carry signal, the output B1 is the same as the bit A1. In like manner, the NOR gates 856, 860, 864, 868, 872, 876, 880 and 884 detect the corresponding carry signals and the input bits A2–A9 are supplied, as inverted versions or without change, to the exclusive OR circuits 858, 862, 866, 870, 874, 878, 882 and 886. Namely, if there are the corresponding carry signals, the bits A2–A9 are inverted to form the outputs B2–B9, respectively. In the presence of the count signal, therefore, the input bits A0–A9 are each counter up by unity to produce the output signals B0–B9.

AND gates 890–908 serve as reset mechanisms. Upon reception of a reset signal, the outputs B0–B9 become all zero, irrespective of the outputs of the exclusive OR circuits 850–886. The count signal and the reset signal for controlling the incrementor whose detail is shown in FIG. 11 are generated by the incrementor controller 490 shown in FIG. 4.

Figure 12A:
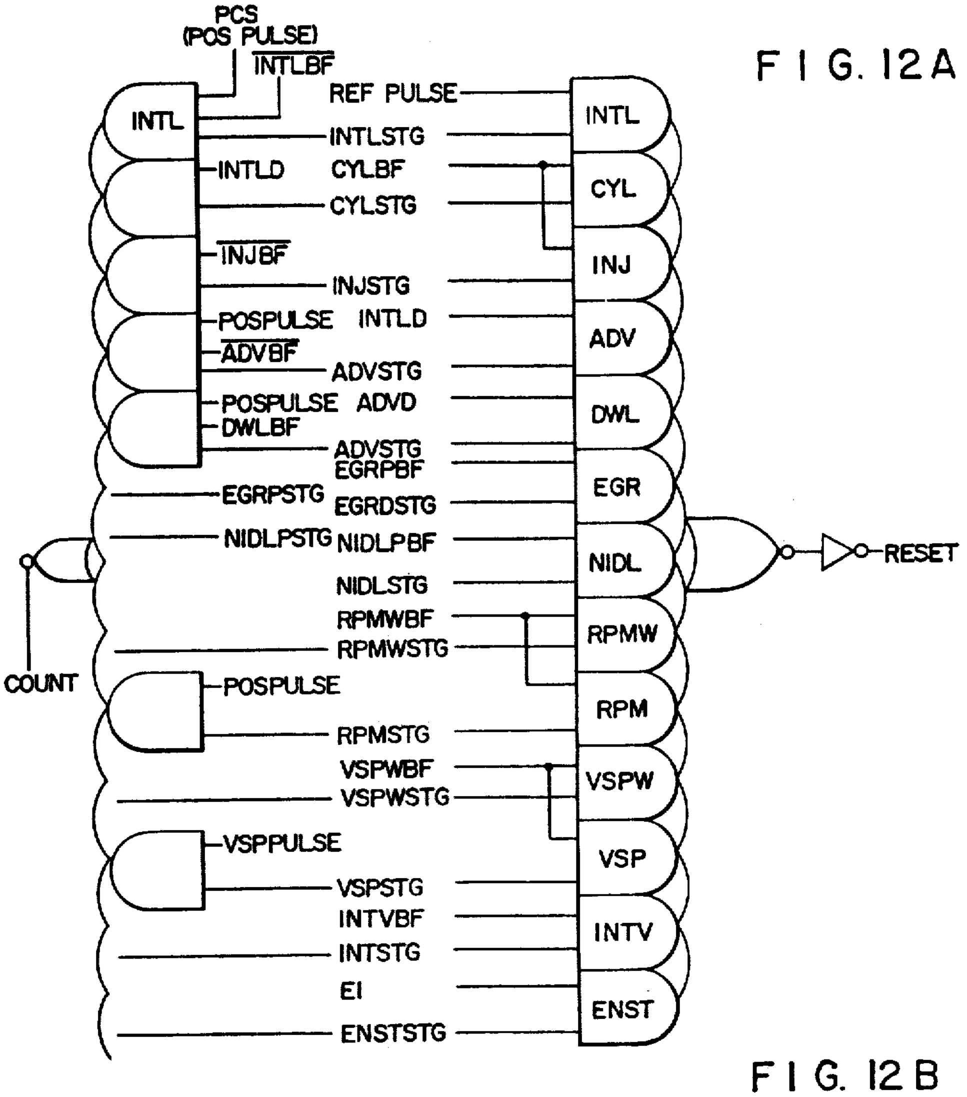
FIGS. 12A and 12B show in detail an incrementor controller.
Figure 12B:
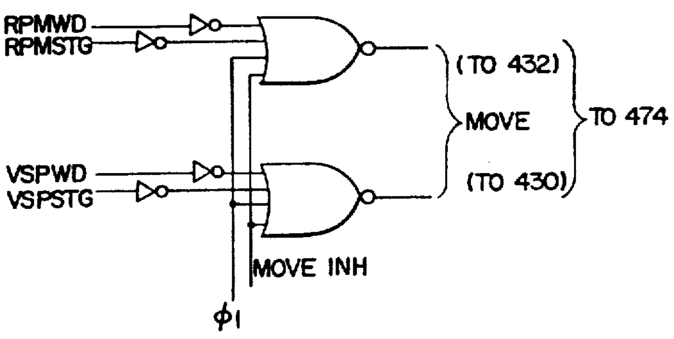

FIGS. 12A and 12B show the details of the incrementor controller 490, FIG. 12A showing a circuit for generating the count signal COUNT and the rest signal RESET for controlling the incrementor 478 and FIG. 12B showing a circuit for generating a signal MOVE for transferring data to the output register groups 430 and 432. As described before, the incrementor has three functions: the first function is to increase the value of the input data by unity, the second is to reset the input data, and the third is to pass the input data without change. The increment function, i.e. the first function to increase the value of the input data by unity, is performed in response to the count signal COUNT and the reset function in response to the reset signal RESET. When the count signal is at the high level, the increment function is performed while the non-increment is performed when the count signal is at the low level. When the reset signal is at the high level, the reset function is carried out. The reset signal is given a preference over the count signal.

The various conditions are selected in response to the stage signals specified by the respective processings. The conditions refer to the synchronized external inputs and the outputs from the second comparison output register group 504. The condition for transferring data to the output register group 474 are the same as that for the control of the incrementor.

Figure 13:
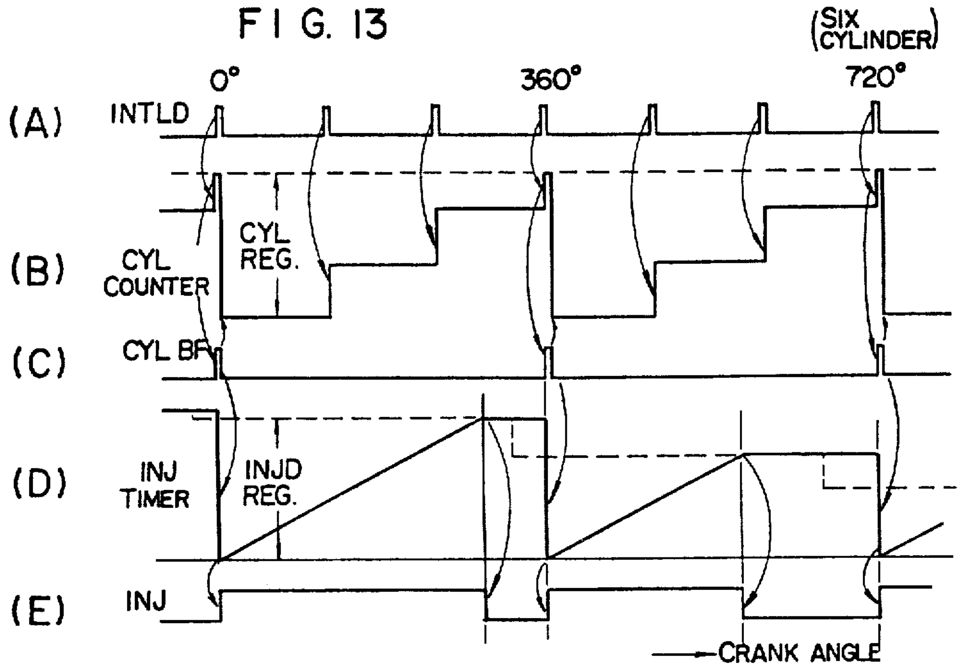
FIG. 13 shows the waveforms useful in explaining the processing of the fuel injection signal.

FIG. 13 illustrates a processing operation according to the fuel injection signal INJ. Since the time of starting the injection of fuel varies depending on the number of cylinder used, the initial angular position pulses INTLD derived from the reference signal PRS are counted by the register 442 serving as a CYL counter. The result of the counting is compared with the content of the CYL register 404 holding a value corresponding to the number of the cylinders. When the result of counting is greater than or equal to the content of the register 404, "1" is set in the CYL FF 506 of the first comparison output register group 502 and further in the CYLBF 508 of the second group 504. The CYL counter 442 is reset if the content of the CYLBF equals 1. Also, for CYLBF=1, the INJ timer 450 for measuring the fuel injection duration is reset. The content of the timer 450 is always increased unconditionally with time and compared with the content of the INJD register 412 holding the data corresponding to the fuel injection duration. When the content of the timer 450 is greater than or equal to the content of the register 412, "1" is set in the INJFF 522 of the first group 502 and further in the INJBF 524 of the second group 504. The unconditional increment with time is inhibited for INJBF=1.

The inverted version of the content of the register INJBF is the fuel injection duration, i.e. the valve opening period of the fuel injector.

Figure 14:
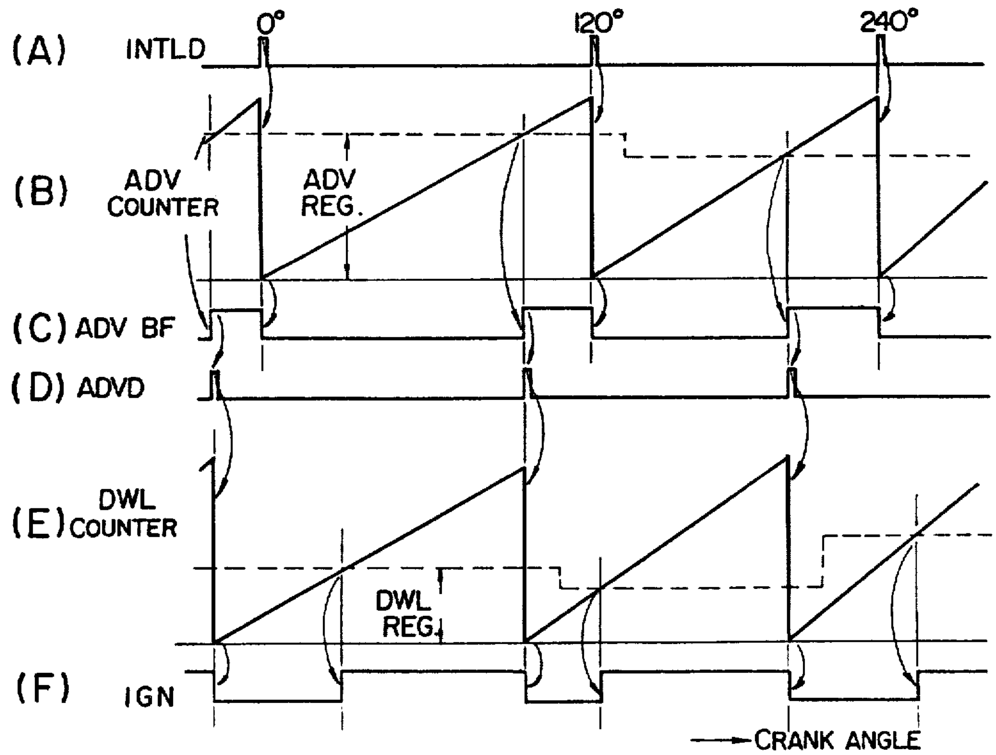
FIG. 14 shows the waveforms useful in explaining the ignition timing control.

FIG. 14 illustrates a processing according to the signal for controlling the ignition. The register 452 serving as the ADV counter is reset by the initial angular position pulse INTLD. The content of the register 452 is increased while the synchronized angular position signal PC is at the high level. The increased content of the register 452 is compared with the content of the register ADV 414 holding the data corresponding to the ignition angle. If the former is greater than or equal to the latter, "1" is set in the register ADVFF 526 of the first group 502 and further in the register ADVBF 528 of the second group 504. The signal ADVD indicating the rising part of the output of the ADVBF resets the DWL counter 454 for instructing the start of conduction. The content of the DWL counter 454 is increased while the synchronized angular position signal PC is at the high level, and then compared with the content of the DWL register 416 holding the data representing the angular position at which the electric conduction takes place, relative to the previous ignition angle. If the former is greater than or equal to the latter, "1" is set in the register DWLFF 530 of the first group 502 and further in the register DWLBF 532 of the second group 504. The output of the DWLBF 532 is the ignition control signal INGI.

Figure 15:
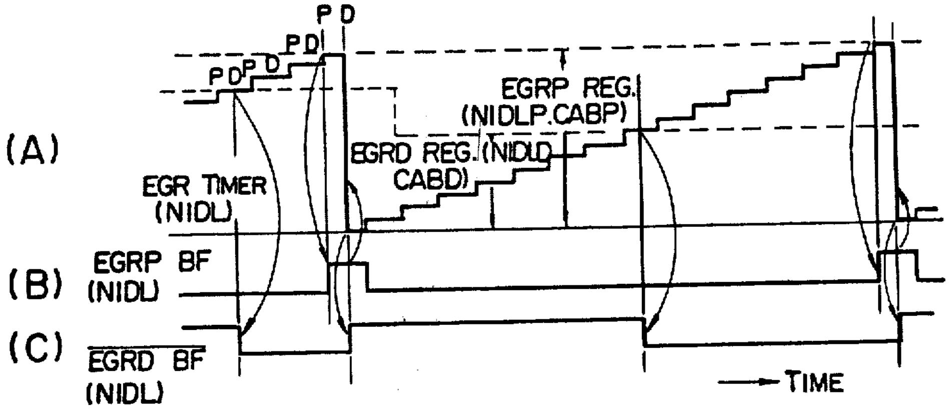
FIG. 15 shows the waveforms useful in explaining the processing by EGR or NIDL.

FIG. 15 illustrates a processing according to the signal EGR(NIDL). The circuit elements 28 for controlling EGR, to which the signal EGR is supplied, employs a proportional solenoid and therefore the control of EGR is effected by controlling the duty cycles of the input signal. They are the EGRP register 418 for holding the period and the EGRD register 420 for holding the on-duration. The timer used in this processing is the EGR timer 456. During the processing in the stage EGRPSTG, the increment in unconditional. If the content of the EGR timer 456 proves to be greater or equal to the content of the EGRP register 418 as the result of comparison, "1" is set in the EGRPFF 534 of the first register group 502 and further in the EGRPBF 536 of the second register group 504.

During the processing in the stage EGRDSTG, the unconditional non-increment takes place and the EGR timer 456 is reset for EGRPBF=1. If, as a result of comparison, the content of the EGR timer 456 is greater than or equal to the content of the EGRD register 420, "1" is set in the EGRD register 538 of the first group 502 and further in the EGRD register 540 of the second group 504. The inversion of the output of the EGRD register 540 is the control signal EGR.

Figure 16:
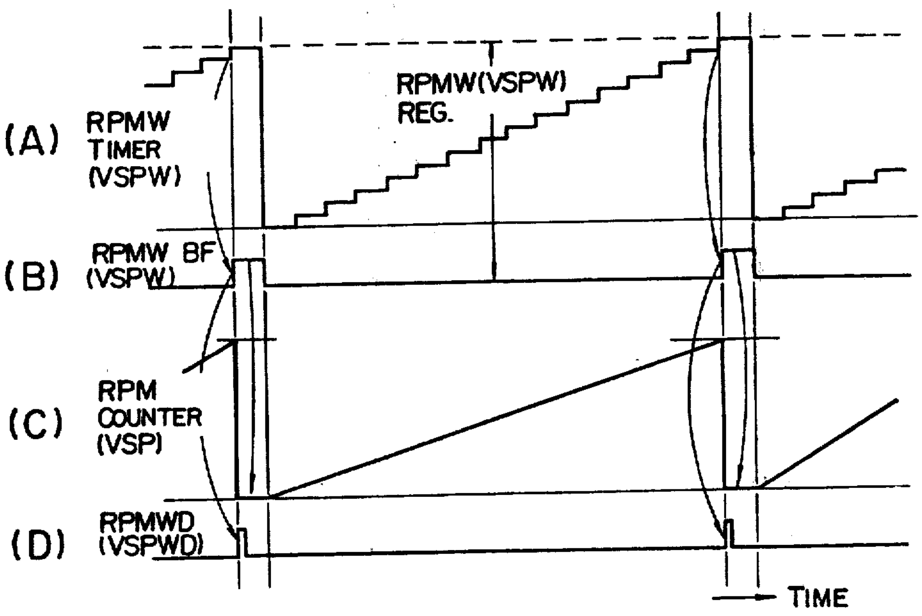
FIG. 16 shows the signal waveform useful in explaining the detection of the rotational speed RPM of engine or the speed VSP of vehicle.

FIG. 16 illustrates the way of measuring the rotational speed of engine RPM (or vehicle speed VSP) and the processing of the measured results. The measurement is performed by determining a certain measurement duration by the RPMW timer 460 and also by counting the synchronized angular position pulses PC within the determined duration by the same counter.

The content of the RPMW timer 460 for measuring the measurement duration is increased unconditionally and reset when the content of the RPMWBF 552 is "1". If, as a result of comparison, the content of the RPMW timer 460 is greater than or equal to the content of the RPMW register 426, "1" is set in the RPMWFF 550.

In response to the signal RPMWD representing the rising part of the output signal of the RPMWBF 552, the content of the RPM counter 462 representing the result of the count of the pulses PC is transferred to the RPM register 430 of the output register group 474. The RPM counter 462 is reset when the content of the RPMWBF 552 is "1". The processing in the stage VSPSTG is similar to that described above.

The functions of the registers used in the embodiment of this invention will be particularized below in the following table 3.

TABLE 3

| No. of register | function of register |
|---|---|
| 402 (ZERO · REG) | to hold the digital value corresponding to zero and to transfer the value to the comparator when required. |
| 404 (CYL · REG) | to hold the data CYL representing the number of the used cylinders, the data CYL being used, for example, to produce a signal representing the rotation of the crank shaft through 360°. |
| 406 (INTL · REG) | to hold the data INTL representing the crank angle and the angle between a predetermined crank angular position and the angular position of the sensor for generating the reference signal INTLS. The reference signal PR from the sensor 98 is shifted by a predetermined value in accordance with the data INTL so as to correspond to the predetermined crank angular position. |
| 408 (INTV · REG) | to hold, as a timer, the data INTV representing the time to measure. If the data INTV is set in the register 408, an interruption signal can be delivered after the lapse of the time. |
| 410 (ENST · REG) | to hold the data ENST representing the time used to detect the accidental stopping of the engine. |
| 412 (INJD · REG) | to hold the data INJD representing the valve opening period of the fuel injector. |
| 414 (ADV · REG) | to hold the data ADV representing the crank angle range measured from the reference angle at which the reference signal is generated to the primary current cut-off angle of the ignition coil. |
| 416 (DWL ·]REG) | to hold the data DWL representing the crank angle range from the angle at which the immediately previous reference signal is generated to the angle at which the primary current is conducted through the ignition coil, in which range the primary current is kept cut off. |
| 418 (EGRP · REG) | to hold the data EGRP representing the pulse period of the pulse current signal EGR for controlling the aperture of the valve of the EGR apparatus. |
| 420 (EGRD · REG) | to hold the data EGRD representing the pulse duration of the pulse current signal EGR for controlling the aperature of the valve of the EGR apparatus. |
| 422 (NIDLP · REG) | to hold the data NIDLP representing the period of the pulse current signal NIDL for controlling the air regulator provided to control the flow of air through the bypass of the throttle chamber. |
| 424 (NIDLD · REG) | to hold the data NIDLD representing the pulse duration of the pulse current signal NIDL. |
| 426 (RPMW · REG) | to hold the data RPMW representing the constant period of time used to detect the rotational speed of the engine. |
| 428 (VSPW · REG) | to hold the data VSPW representing the constant period of time used to detect the vehicle speed. |
| 442 (CYLC · REG) | to hold the instantaneous number representing the number of arrivals of the reference signal pulses. |
| 444 (INTLC · REG) | to hold the number of the crank angle pulses delivered after the delivery of the reference pulse from the angular position sensor 98. |
| 446 (INTVT · REG) | to hold the instantaneous value of the variable which increases at regular |

TABLE 3-continued

| No. of register | function of register |
|---|---|
| | intervals, e.g. every 1024 μsec, after the proper data has been set in the INTV register 408. |
| 448 (ENST · REG) | to hold the instantaneous value of the variable which increases at regular intervals, e.g. every; 1024 μsec, after the reference pulse has been delivered from the angular position sensor 98. The content of the register 448 is reduced to zero upon reception of the reference pulse. |
| 450 (INJT · REG) | to hold the instantaneous value of the variable which increases at regular intervals, e.g. every 8 μsec, 16 μsec, 32 μsec, 64 μsec, 128 μsec or 256 μsec, after the CYL signal has been delivered. The above interval of time is chosen by the T register. |
| 452 (ADVC · REG) | to hold the instantaneous value of the variable which increases each time the angular position sensor 98 delivers the signal PC representing the rotation of a fixed crank angle, e.g. 0.5 degree, after the reference signal INTLS has been delivered. |
| 454 (DWLC · REF) | to hold the instantaneous value of the variable which increases each time the angular position sensor 98 delivers the crank angle position signal PC after the immediately previous signal INTLS has been delivered. |
| 456 (EGRT · REG) | to hold the instantaneous value of the variable which increases at regular intervals, e.g. every 256 μsec, after the signal EGRP has been delivered. |
| 458 (NIDLT · REG) | to hold the instantaneous value of the variable which increases at regular intervals, e.g. every 256 μsec, after the signal NIDLP has been delivered. |
| 460 (RPMWT ·REG) | to hold the instantaneous value of the variable which increases at regular intervals of time after the second comparison result holding register 552 has delivered an output pulse. |
| 462 (RPMC · REG) | to hold the instantaneous value of the variable which increases each time the angular position sensor 98 delivers the angular position signal PC representing a fixed crank angle, after the second comparison result holding register 552 has been delivered an output pulse. |
| 430 (RPM · REG) | to hold the data transferred from the register 462 in response to the output signal from the second comparison result holding register 552. The data is delivered onto the data bus in accordance with the address signal and the control instruction from the CPU 114. |
| 464 (VSPWT · REG) | to hold the instantaneous value of the variable which increases at regular intervals of time after the second comparison result holding register 556 has delivered an output. |
| 468 (VSPC · REG) | to hold the instantaneous values of the variable which increases each time one of the pulses corresponding to the rotational speed of the wheel is generated, after the second comparison result holding register 556 has delivered an output pulse. |
| 432 (VSP · REG) | to hold the data transferred to the register 468 in response to the output signal of the second comparison holding register 556. The data is delivered onto the data bus in accordance with the address signal and the control instruction from the CPU 114. |
| 506 (CYLFF) | to have "1" set in if the data of the register 404 is less than or equal to the data of the register 442. |
| 508 (CYLBF) | to have the signal from the register 506 set in in timing with the clock signal φ2. |
| 510 (INTLFF) | to have "1" set in if the data of the register 406 is less than or equal to the data of the register 444. |
| 512 (INTLBF) | to have the signal from the register 510 set in in timing with the clock signal φ2. |
| 514 (INTVFF) | to have "1" set in if the data of the register 408 is less than or equal to the data of the register 446. |
| 516 (INTVBF) | to have the signal from the register 514 set in in timing with the clock signal φ2. |
| 518 (ENSTFF) | to "1" set in if the data of the register 410 is less than or equal to the data of the register 448. |
| 520 (ENSTBF) | to have the signal from the register 518 set in in timing with the clock signal φ2. |
| 522 (INJFF) | to have "1" set in if the data of the register 412 is less than or equal to the data of the register 450. |
| 524 (INJBF) | to have the signal from the register 522 set in in timing with the clock signal φ2. |
| 526 (ADVFF) | to have "1" set in if the data of the register 414 is less than or equal to the data of the register 452. |
| 528 (ADVFF) | to have the signal from the register 526 set in in timing with the clock signal φ2. |
| 530 (DWLFF) | to have "1" set in if the data of the register 416 is less than or equal to the data of the register 454. |
| 532 (DWLBF) | to have the signal from the register 530 set in in timing with the clock signal φ2. |
| 534 (EGRPFF) | to have "1" set in if the data of the register 418 is less than or equal to the data of the register 456. |
| 536 (EGRPBF) | to have the signal from the register 534 set in in timing with the clock signal φ2. |
| 538 (EGRDFF) | to have "1" set in if the data of the register 420 is less than or equal to the data of the register 456. |
| 540 (EGRDBF) | to have the signal from the register 538 set in in timing with the clock signal φ2. |
| 542 (NIDLPFF) | to have "1" set in if the data of the register 422 is less than or equal to the data of the register 458. |
| 544 (NIDLPBF) | to have the signal from the register 542 set in in timing with the clock signal φ2. |
| 546 (NIDLDFF) | to have "1" set in if the data of the register 424 is less than or equal to the data of the register 458. |
| 548 (NIDLDBF) | to have the signal from the register 546 set in in timing with the clock signal φ2. |
| 550 (RPMWFF) | to have "1" set in if the data of the register 426 is less than or equal to the data of the register 460. |
| 552 (RPMWBF) | to have the signal from the register 550 set in in timing with the clock signal φ2. |
| 554 (VSPWFF) | to have "1" set in if the data of the register 428 is less than or equal to the data of the register 464. |
| 556 (VSPWBF) | to have the signal from the register 556 set in in timing with the clock signal φ2. |

Now, description will be made of how the reference data is set in the reference register group 470. The registers 402, 404, 406 and 410 have their data set at the time of starting the apparatus as the embodiment of this invention. The values of the data are never changed once they have been set in the registers. The setting of data in the register 408 is performed according to the programmed processing.

The register 412 receives the data INJD representing the value opening duration of the fuel injector 66. The data INJD is determined, for example, as follows. The output signal QA of the air-flow meter 14 is sent through the multiplexer 122 to the analog/digital converter 124. The digital data delivered from the A/D converter 124 is held in a register (not shown). The load data TP is obtained from the above data representing the quantity of sucked air and the data held in the register 430 shown in FIG. 4, through arithmetic operations or on the basis of the information stored in a map fashion. The outputs of the sensor 16 for the temperature of the sucked air, the sensor for the temperature of the cooling water and the sensor for the atmospheric pressure are converted to digital quantities, which are corrected according to the load data TP and the condition of the engine at operation. Let the factor of such a correction be $K_1$. The voltage of the battery is also converted to a digital quantity. The digital version of the battery voltage is also corrected according to the load data TP. Let the correction factor in this case be TS. Next, the correction by the $\lambda$ sensor 80 takes place and let the correction factor associated be $\alpha$. Therefore, the data INJD is given by the following expression.

$$INJD=\alpha(K_1 \cdot TP+TS)$$

Thus, the valve opening duration of the fuel injector is determined. The above method of determining the data INJD is merely an example and other methods may be employed.

The data ADV representing the ignition timing is set in the register 414. The data ADV is made up, for example, as follows. The map-like ignition data QIG with the data TP and the rotational speed as factors is held in the ROM 118. The data QIG is then subjected to starting correction, water temperature correction and acceleration correction. After these corrections, the data ADV is obtained.

The data DWL for controlling the charging period for the primary current through the ignition coil is set in the register 416. This data DWL is obtained through arithmetic operation from the data ADV and the digital value of the battery voltage.

The data EGRP representing the period of the signal EGR and the data NIDLP representing the period of the signal NIDL are set respectively in the registers 418 and 422. The data EGRP and NIDLP are predetermined.

The data EGRD representing the duration of opening the valve of the EGR (exhaust gas recurrent) apparatus is set in the register 420. As the duration increases, the aperture in the valve increases to increase the rate of recurrence of exhaust gas. The data EGRD is held in the ROM 118 in the form of, for example, a map-like data with the load data TP and the rotational speed as factors. The data is further corrected in accordance with the temperature of the cooling water.

The data NIDLD representing the duration of energizing the air regulator 48 is set in the register 424. The data NIDLD is determined, for example, as a feedback signal derived from such a feedback control that the rotational speed of the engine under no load condition always equals a preset fixed valve.

The data RPMW and VSPW representing fixed periods of time are set respectively in the registers 426 and 428 at the beginning of the operation of the apparatus.

In the foregoing description of the embodiment of this invention, the output of the air-flow meter is used to control the amount of injected fuel, the advance of ignition angle and the recycle rate of exhaust gas. Any sensor other than the air-flow meter, however, may be employed to detect the condition of the sucked or drawn in air. For example, a pressure sensor for detecting the pressure in the intake manifold may be used for that purpose.

As described above, according to this invention, pulse signals received irregularly with respect to the stage cycle are synchronized so that exact detections can be assured.

Further, in the embodiment of this invention described above, since the stage cycle is constituted of major cycles each of which consists of minor cycles, the detection cycle can be controlled in accordance with the precision required. Moreover, since each of the stages for detecting the synchronized signals are processed for a period in the order of a minor cycle, exact detections can be assured even when the engine is operating at a high speed.

Furthermore, the above described embodiment of this invention has a reference register group, an instantaneous register group and a comparison result holding register group and a register is selected from each of the register groups and connected with the comparator in accordance with the outputs of the stage counter, so that so many control functions can be effected by a relatively simple circuit.

Figure 17:
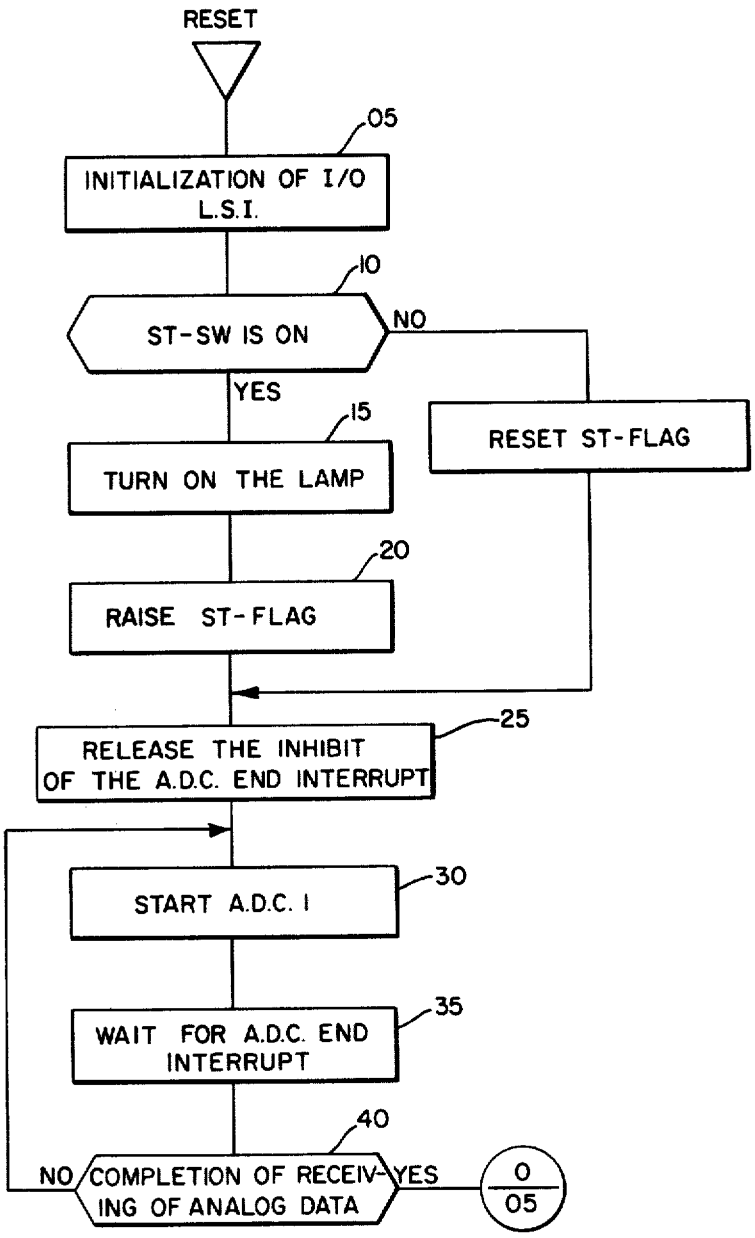
FIGS. 17-20 depict a flow chart for starting the engine according to one embodiment of the invention.

FIGS. 17, 18, 19 and 20 are flow charts for controlling the starting of the engine. Referring, first, to FIG. 17, initialization data is set in the registers of the input/output circuit through a step 05. The details of step 05 will be explained later with reference to FIG. 28. First, when the power supply is turned on by the driver, the CPU 114 of FIG. 3 is placed into operation, and an initializing program in ROM 118 is executed. FIG. 17 shows the execution initiating program; the operation is started from the RESET state. Further, in the circuit of FIG. 4, when the stopping of the engine is detected by the registers 410, 440 and comparator 480, and the CPU 114 is interrupted via the STATUS register, the control system acquires the RESET state as shown in FIG. 17; the engine is started according to the flow chart of FIG. 17. The data necessary for the I/O LSI (register group 470 of FIG. 4) is set in the step 05. Once predetermined values have been set in the register group 470 of the input/output unit (FIG. 4), the process proceeds to step 10. Whether the current flow path through the starter switch (designated at 176 in FIG. 3) is interrupted or connected is determined in steps 10 to 20. When the starter switch is turned on (closed), a lamp is energized and a starter flag is raised. The lamp is designated, for example, at 208 or 210 in FIG. 3 and is turned on by sending a signal to the DSCI/O 130. This enables the alarm lamp to be checked. The place where the starter flag should be raised is stored in the RAM (random access memory) 116.

Steps 25 to 40 have such functions that a d-c input which is analog data, is converted into a digital signal and is set in a predetermined register in the RAM 116. The data selected here pertains to the first analog group ADCl, consisting of a high reference voltage VH, a low reference voltage VL, water temperature TW, drawn-in air temperature TA and power supply voltage VB from the battery, employed for the A/D conversion.

The step 25 cancels the interrupted state so that the digital data of the first analog group ADCl can be accepted. The step 30 causes the A/D converter 124 to be placed in operation.

Here, the high reference voltage VH and the low reference voltage VL are so determined that voltage is representative of the water temperature TW, drawn-in air temperature TA and the like that are to be subjected to A/D conversion are necessarily placed between VH and VL. The times in which a voltage higher than the high reference voltage VH reaches the levels VH, VL, and further reaches the input voltages TW and TA, are measured to calculate the values TW and TA. After the calculation is finished, an interrupt signal ADC1.END is produced. The step 35 waits for the interruption signal, and accepts the data upon receipt of the interruption signal.

The step 40 determines whether the reception of the necessary analog data is completed or not. When the result is no, a multiplexer (designated at 122 in FIG. 3) is switched to accept the subsequent data.

Figure 18:
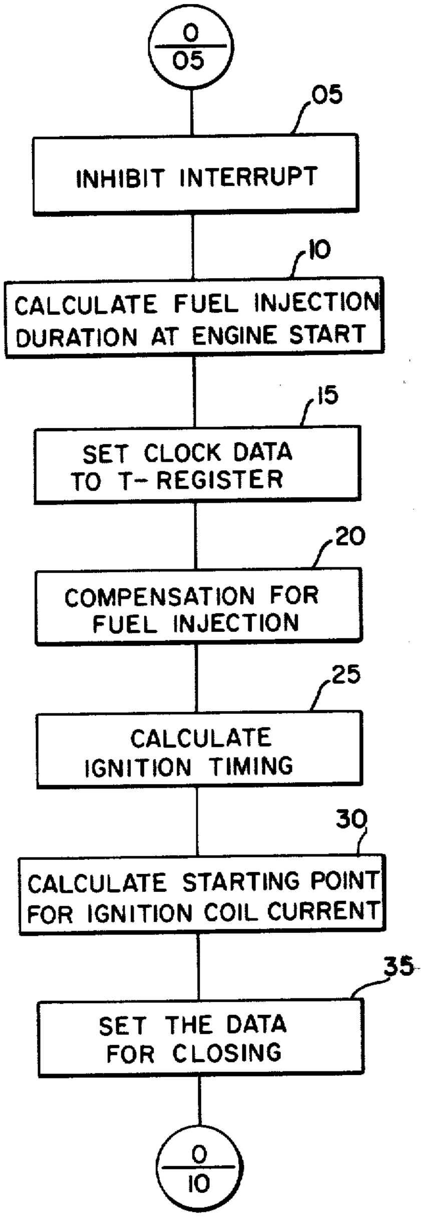

When the result of the data reception is yes, the process proceeds to step 05 shown in FIG. 18. In order to prevent any interrupt operation inclusive of engine stalling, this step 05 sets a signal for inhibiting the interrupt in the MASK register. Owing to this operation, no operation is carried out to deal with the interrupt even when various interruption signals inclusive of an engine stalling signal are set in the status register.

A fuel injection time TIS at the time of starting the engine is calculated in the following step 10. Based upon the calculated results of the fuel injection time TIS, an INJ stage period corresponding to a clock pulse is adjusted to determine the time for opening the fuel injection valve. In short, a signal is set in the T register of FIG. 4 to control the output of the stage decoder 572.

In step 20, the fuel injection time TIS is corrected with reference to the battery voltage which has been received beforehand, and the corrected value is set in the INJ register 412.

Step 25 calculates ignition timing during the starting period, sets the calculated value in the ADV register, and step 30 calculates the time for starting the flow of electric current during the starting period of the engine. The time for starting the flow of electric current may be determined beforehand, and the value may be read out from a predetermined memory address. The time for starting the flow of electric current is set in the DWL register 416.

In step 35, data is set in the EGRD register 420 of FIG. 4, in order to completely close the exhaust gas recycling device (EGR valve) of FIG. 1.

Figure 19:
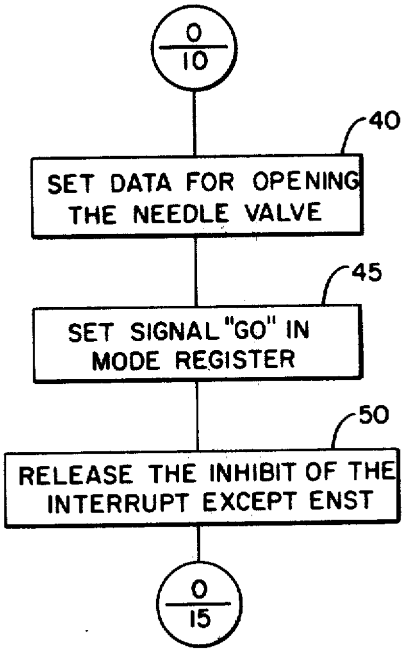

The process then advances to step 40 of FIG. 19. In this step, data is set in the NIDLD register 424 of FIG. 4, so that the air regulator 48 (NIDLE valve) of FIG. 1 is fully opened.

Once all the data is set as mentioned above, a signal from the CPU 114 is applied to the 2° bit of the MODE register of FIG. 4, and a GO signal is fed to the stage decoder of FIG. 6. This enables the stage signals to be produced in accordance with Table 1. Therefore, owing to the processing operation in step 45, the actuators shown in FIG. 1 are allowed, for the first time, to begin operation.

Next, in step 50, a signal is sent to the MASK register of FIG. 4, and all interrupts except the ENST interrupt are cancelled, i.e., interrupts based on the INTL register 512, INTV register 516, first group conversion end signal ADC1END from the A/D converter 124, and second group conversion end signal ADC2END are cancelled.

Figure 20:
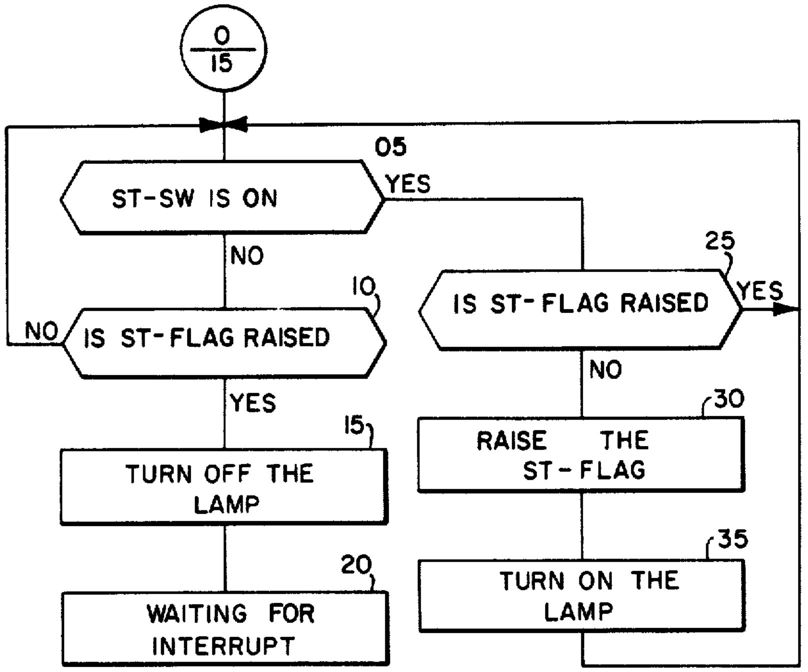

The process then proceeds to the flow chart of FIG. 20. The flow chart of FIG. 20 is used to determine whether the starter switch 176 of FIG. 1 is once turned on causing the starter motor to run, or whether the starter switch has not yet been turned on and the starter motor has not yet been energized.

First, step 05 determines whether the starter switch 176 is turned on or not. When the starter switch is turned on, the result is yes, and the process proceeds to a step 25. The step 25 determines whether the starter flag is raised in the RAM 116. When the flag is raised, the process is returned again from the yes decision point to the starting point 0-15. When the result is no, the process proceeds to step 30 to raise the starter flag. The lamp is then turned on, and the process is returned to the starting point 0-15. The operations of the steps 30 and 35 are the same as the operations of the steps 15 and 20 of FIG. 17.

When the starter switch open step 05 is in the, the process proceeds from no to a step 10 where whether the starter flag has been raised or not is determined. When the starter flag is raised, the process proceeds from yes to step 15. This state indicates that the engine has been started by the starter motor. The step 15 turns off the alarm lamp, and step 20 waits for an interruption signal. Under this state, however, the CPU 114 is carrying out low level tasks, such as the calculation of a recycling rate of exhaust gas. Under this state, when interrupt signals for demanding the beginning of such calculations as the amount of fuel injection and ignition timing are introduced, processing operations are carried out based on the interrupt signals. When the starter flag has not been raised in the step 10, the process returns again from no to the starting point 0-15. This state indicates that a key switch is introduced in the key hole, but the starter switch has not yet been turned on by the driver.

The step 20 cancels even the ENST interrupt. With the engine stalling condition interrupt being cancelled, in case the engine is stopped after the starter switch has been turned off, the ENST register 520 applies an ENST interrupt signal to the $2^3$th bit in the status register, such that the process returns again to the RESET state of FIG. 17.

When the starter switch is not turned on, the process will acquire the no state in the step 10 of FIG. 17, such that the starter flag is reset.

Figure 28:
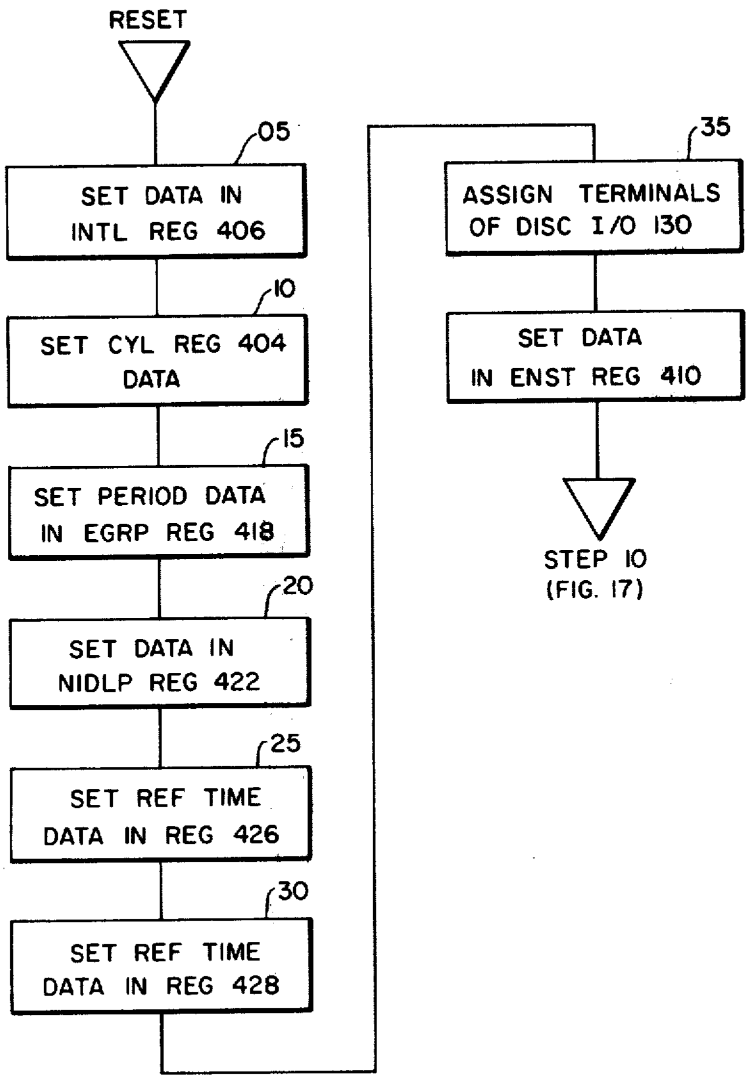
FIG. 28 is a flow chart of the initialization step of FIG. 17.

FIG. 28 shows in detail the initialization of the I/O LSI in the step 05 of FIG. 17. When the key switch is turned on, the process proceeds to the step 05. This enables the data which indicates the difference between a reference position and a reference mark of a crank angle sensor, to be set in the INTL register 406 of FIG. 4. In step 10, a value corresponding to the number of cylinders is set. In this embodiment, the value is 2 for the four-cylinder engines, 3 for the six-cylinder engines, and 4 for the eight-cylinder engines. Next, a pulse period of the exhaust gas recycling device is determined in a step 15. Data of a predetermined period is set in the EGRP register 418.

In step 20, period-representative data is set in the NIDLP register 422 to determine the pulse period for controlling air regulator of FIG. 1.

In a step 25, data for indicating reference time for measuring the running speed of the engine is set in the RPMW register, and similarly, data which indicates a reference time for measuring the wheel speed is set in the VSPW register 428.

Step 35 determines whether each of the terminals of the DISCRETE I/O 130 of FIG. 3 should be used as input terminals or output terminals. Further, in step 40, time data for measuring the engine stalling condition is set in the ENST register 410. When the function of the step 40 is finished, the process proceeds to the step 10 of FIG. 17.

Figure 21:
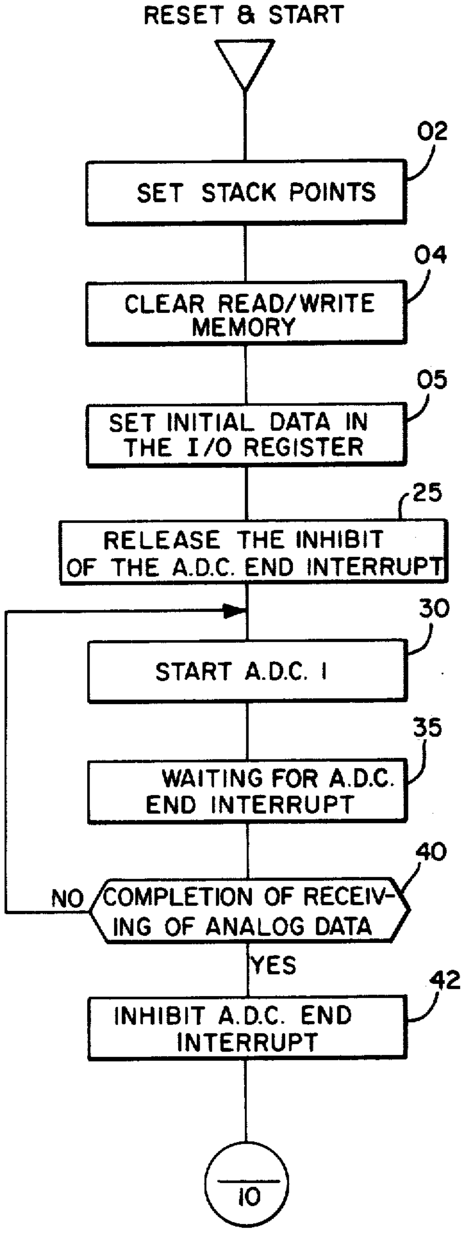
FIGS. 21, 22 and 27 depict a flow chart for starting the engine according to another embodiment of the invention.

FIG. 21 shows another embodiment of FIG. 17. Like the embodiment of FIG. 17, when the key switch of a car is turned on, the CPU 114 of FIG. 3 is operated, and electric power is also supplied to the I/O LSI 120. This places the I/O LSI 120 in an operative state, whereas the register group 470, MODE register, STATUS register, MASK register and T register shown in FIG. 4 are all cleared. Therefore, no stage signal is produced, and no demand for interrupt is produced, either. Accordingly, an interrupt based on the stalling condition of the engine is prevented from being produced.

Figure 23:
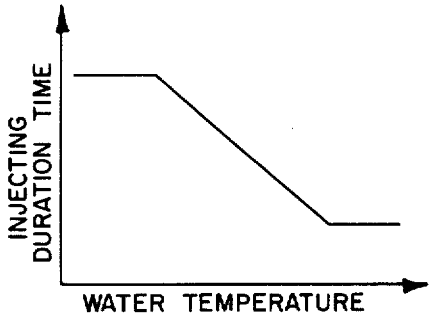
FIG. 23 is a graph illustrating the relationship between fuel injection duration time and water temperature.
Figure 24:
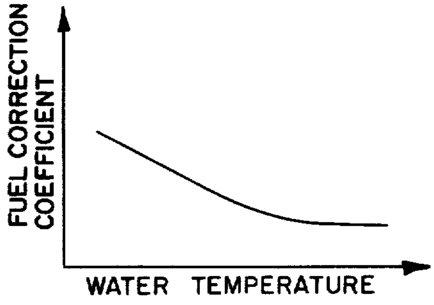
FIG. 24 is a graph illustrating the relationship between a fuel correction coefficient and water temperature.
Figure 25:
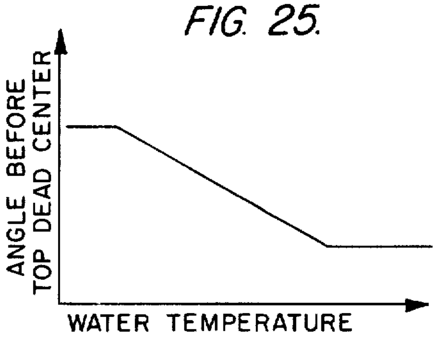
FIG. 25 is a graph illustrating the relationship between the angle before top dead center and water temperature.
Figure 26:
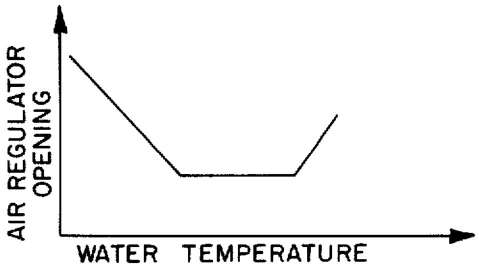
FIG. 26 is a graph illustrating the relationship between the air regulator opening and water temperature.
Figure 22:
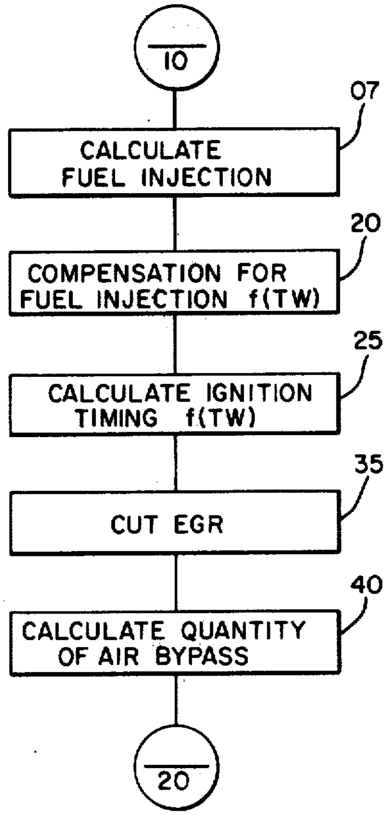

First, step 02 addresses a stack pointer. The next step 04 clears the RAM 116 used for reading and writing. Since the RAM 116 contains specified areas for each flag necessary for controlling the engine, the flags are all cleared. Like the step 05 of FIG. 17, step 05 of FIG. 21 sets the initial data in the register group 472 which is an input/output interface register. Therefore, the details are shown in FIG. 28. Then, only the mask of an END interrupt of ADI in the A/D converter is cancelled. This is the same operation as that performed in the step 25 of FIG. 17; a 1 is set as the 5th bit in the MASK register of FIG. 4. The operations of steps 30, 35 and 40 are the same as the operations of steps 30, 35 and 40 of FIG. 17. When the step 40 receives all of the necessary data, step 42 masks the END interrupt of the A/D converter. This is attained by setting at zero the 5th bit of the MASK register of FIG. 4. The process then proceeds to step 07 of FIG. 22. In this step, the quantity of starting fuel is calculated based on the water temperature TW received through the ADI, characteristics of which are shown in FIG. 23. Then, like the step 20 of FIG. 18, step 20 of FIG. 22 calculates the correction coefficient of the fuel. As shown in FIG. 24, the coefficient takes an increasing value with an decrease in water temperature; the amount of the fuel is increased. After the engine is started, the fuel is injected at a corrected amount. After a given period of time has passed from the start of the engine, the coefficient of correction is decreased to prevent fuel from adhering to the walls in the cylinders or the spark plugs. Then, step 25 calculates the ignition timing for starting the engine. This value is determined from a relation shown in FIG. 25. Like the step 35 of FIG. 18, step 35 of FIG. 22 sets zero in the EGRD register 538 of the register group 502. This causes the exhaust recirculation valve to be completely closed. Step 40 calculates the opening degree of the air regulator 48 of FIG. 1. FIG. 26 shows the relation between the opening angle of the air regulator 48 and the water temperature. A digital value indicating the opening degree is set in the register 546 of FIG. 8. After these data have all been set, the control is shifted from the monitoring of starting and the actual starting of FIG. 27 to the control of the idling state.

Figure 27:
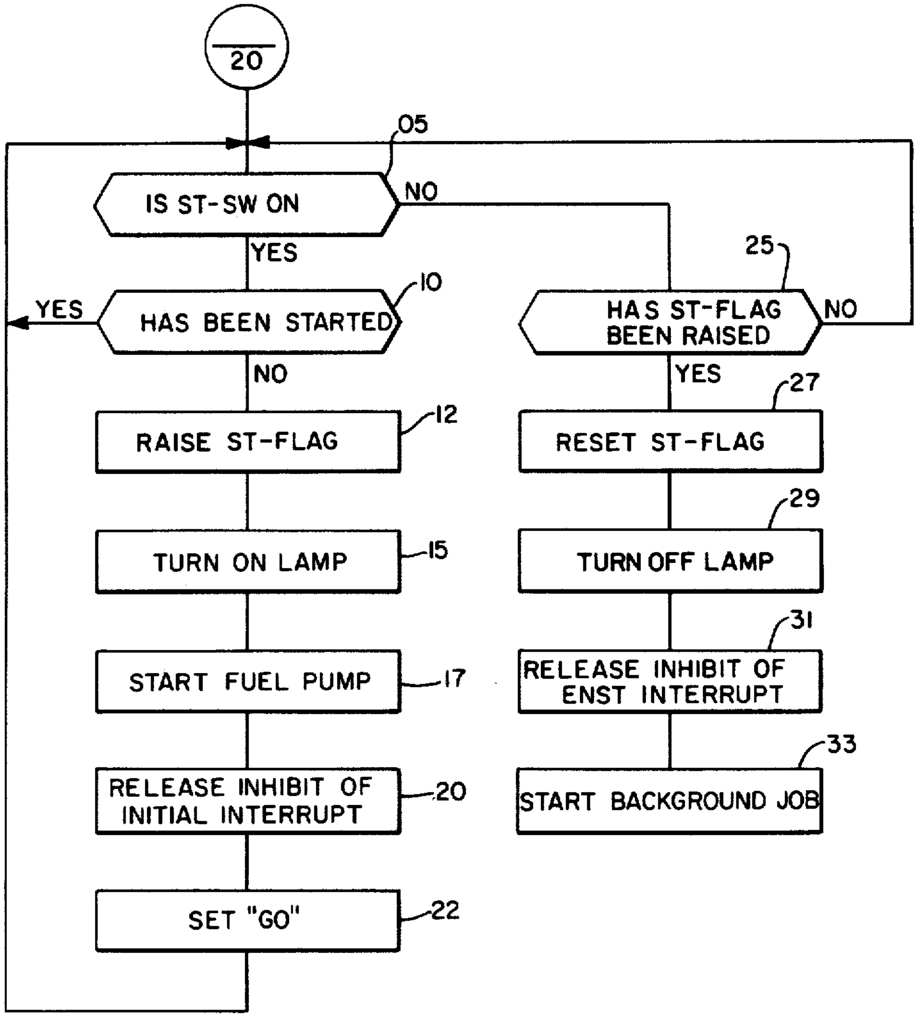

The fundamentals of the abovementioned operation are as shown in FIG. 27. The step 05 determines whether the starter switch 176 is turned on or not. When the starter switch is not turned on, the fact is either that there was no attempt to turn on the starter switch or the starter switch was turned off after the engine was started; this fact is determined by the step 25. When there was no attempt to turn on the starter switch 176 of the starter motor, the process is returned again from the step 25 to the starting point of the flow chart. The operation of the starter switch according to this path is repetitively monitored until the starter switch 176 is turned on.

As the starter switch 176 is turned on, information is received by the DISCRETE I/O 130, where the process proceeds from the step 05 to the step 10 based on the information. Step 10 determines whether the flag has already been raised or not. When no flag is raised, step 12 raises the flag. The alarm lamps are then turned on to indicate that the engine is in a cranking state. This determination can be attained if the alarm lamps are not faulty. Step 17 actuates a fuel pump 206. Step 20 cancels the masks of the rotation interrupt and timer interrupt. That is, the $2^7$th bit and the $2^4$th bit of the MASK register of FIG. 4 are set to be "1", respectively. An interrupt signal is set at the $2^7$th bit and the $2^4$th bit of the STATUS register, and set to the CPU. Here, however, since "1" has not been set as the $2^0$th bit of the MODE register, no stage signal is produced. Accordingly, there is at present no cause for feeding the interrupt signal to the STATUS register.

Up to now, the output circuit of the I/O LSI 120 has been prevented from starting its operation. Therefore, only the input circuit system of the I/O LSI is operating. During the operation up to this moment, predetermined values have been set in the register group 470 of the I/O LSI 120. Further, since the starter switch 176 has been turned on, the output system of the I/O LSI is ready to be started. Therefore, the step 22 sets a "1" at the $2^0$th bit of the MODE register of FIG. 4, such that the output system of the I/O LSI starts the operation. The process is then returned to the starting point of the flow chart of FIG. 27.

The process proceeds again to the step 05 and then to the step 10. Here, the flag has already been raised by the step 12 in the previous operation; the flag has therefore been raised. The process then proceeds toward "YES" and returns again to the starting point of the flow chart. This operation continues until the engine runs under its own power and until the driver turns off the starter switch. As the engine runs under its own power, and the starter switch is turned off, the process proceeds to the step 25 where whether the flag is raised or not is determined. When the engine is started, there will be the flag raised by step 12, and the presence of the flag is confirmed by step 25 whereby the process proceeds to the step 27 where the flag raised by the step 12 will be cleared. Further, step 29 turns off the alarm lamps that were turned on by step 15. This works to return the discrete output of the I/O LSI 120 to "0".

Since the engine is already running under its own power, step 31 cancels the mask for producing the engine stalling interrupt. This sets a "1" at the $2^3$th bit of the MASK register of FIG. 4. Consequently, when the engine is stopped, the engine stalling interrupt is produced to deal with the engine stalling condition. The process is shifted by the step 23 toward the processing routine under ordinary conditions, and the processing of the initial program associated with the starting of the engine is completed.

What is claimed is:

1. A method of operating a processor-controlled apparatus for controlling the operation of a combustion engine, said engine including an output shaft driven by mechanical energy converted from heat energy caused by the combustion of a fuel, at least one means controlling energy conversion in response to control signals applied thereto, and engine starting means which includes switching means having first and second states and wherein, during the second state of said switching means, said engine is started by a starter motor, said apparatus being coupled to receive signals produced by sensor means indicative of operating conditions of the engine and including input/output means adapted to receive sensed signals from said sensor means and to deliver control signals to said energy conversion controlling means, said input/output means including first means for generating said control signals in accordance with processor-generated engine control data and second means for producing a starter signal representative of the state of the switching means;

said method comprising the steps of:

(a) detecting a change to the first state from the second state of said switching means in accordance with the starter signal produced by the second means of the input/output means; and (b) starting, in accordance with step (a), an operation for detecting the condition of the stopping of energy conversion, so as to return said first means of said input/output means to a prescribed initial condition in response to the termination of energy conversion by said engine.

2. A method according to claim 1, wherein step (b) comprises the step of:

starting, in accordance with step (a), an operation for detecting the condition of stopping of the engine shaft, so as to return said first means of said input/output means to a prescribed initial condition in response to the rotation stop condition of said engine output shaft.

3. A method according to claim 1, wherein said method further includes the steps of:

(c) causing processor-generated initial digital engine control data to be provided on the basis of the sensed signals; and (d) delivering said initial digital engine control data to the first means of the input/output means, said steps (a) and (b) being performed after steps (c) and (d), and said step (b) including a step of returning to the step (c) in accordance with the detection of the stopping of energy conversion by said engine.

4. A method according to claim 1, wherein said energy conversion controlling means includes fuel supply means for controlling the quantity of fuel to be converted into heat energy in accordance with a control signal generated by the first means; and a fuel pump for delivering fuel to said fuel supply means; and wherein said method further includes steps of (c) causing processor-generated initial digital engine control data to be provided on the basis of sensed signals;

(d) delivering said initial digital engine control data to the first means of the input/output means;

(e) detecting the second state of the switching means of the engine starting means; and (f) energizing the fuel pump in accordance with the detection of step (e);

said step (a) being performed after steps (d) and (e).

5. A method according to claim 4, wherein the first means of the input/output means includes a mode register for receiving a processor-generated GO signal representative of the state of operation of said input/output means and third means for delivering said control signals in accordance with the GO signal received by the mode register; and wherein said method further includes the steps of (g) applying said GO signal to the mode register after the step (d); and (h) returning the mode register to its initial condition for stopping the operation of the third means of the input/output means in accordance with the detection of the stopping of energy conversion by said engine.

6. A method according to claim 4, wherein the first means of the input/output means includes a mode register for receiving a processor-generated GO signal representative of the state of operation of said input/output means and third means for causing delivery of said control signals in accordance with the GO signal set into the mode register; and wherein said method further includes the steps of (g) applying said GO signal to the mode register after step (e); and (h) returning the mode register to its initial condition for stopping the output of the third means of the input/output means in accordance with the detection of stopping of energy conversion by said engine.

7. A method according to claim 5, wherein said method further includes the steps of (i) resetting a memory of said processor in accordance with the power applied to said processor; and (j) resetting the mode register, the step (c) being performed after steps (i) and (j).

8. A method according to claim 1, wherein said step (a) includes the steps of (a1) detecting the second state of said switching means in accordance with said starter signal;

(a2) setting a starter flag in accordance with detection of the second state of said switching means;

(a3) detecting the first state of said switching means in accordance with the starter signal; and (a4) detecting the change to the first state from the second state of said switching means.

9. A method according to claim 1, wherein said input/output means includes a STATUS register for receiving a pulse generated in accordance with an engine stop condition and a MASK register for providing a signal representing the engine stop condition to be coupled to said processor in accordance with control signal reception, and wherein step (b) includes the step of setting the control signal into said MASK register in accordance with the detection of the change to the first stage from the second state of said switching means.

10. A method according to claim 1, wherein said step (b) includes the steps of (b1) detecting the engine stop condition;

(b2) returning said first means to the initial condition in accordance with the detection of the engine stop condition during a set condition of the control signal; and (b3) setting the control signal in accordance with the detection of the step (a).

11. A method of operating a processor-controlled apparatus for controlling the operation of an internal combustion engine having an output shaft rotatably driven by mechanical energy generated in response to the combustion of fuel supplied to the engine, said engine including a starter motor for starting the engine, said starter motor being coupled to starter means including switching means having first and second states, said starter motor being energized in response to said switching means being in a second of first and second states into which said switching means may be placed, said apparatus including sensor means for producing signals representative of operating conditions of the engine and an input/output unit coupled to receive signals produced by said sensor means and to deliver control signals to be coupled to the engine to control energy conversion functions of the engine, said input/output unit including first means for generating said control signals in accordance with processor-generated engine control data;

said method comprising the steps of:

(a) generating a first signal in response to said switching means being in said second state;

(b) in response to said switching means being in said first state, detecting whether or not said first signal has been generated; and (c) in response to detecting that said first signal has been generated, monitoring an energy conversion function of said engine and, upon detecting a stopping condition of said energy conversion function, inhibiting said first means from generating said control signals.

12. A method according to claim 11, wherein step (c) comprises monitoring the rotation of said output shaft and, upon detecting a stopping condition of said shaft, inhibiting said first means from generating said control signals.

13. A method according to claim 11, wherein the step (a) of generating said first signal comprises the step of storing in said processor first prescribed data.

14. A method according to claim 11, wherein said engine further includes a fuel pump for controllably supplying fuel to the engine and wherein said method further comprises the step (d) of starting said fuel pump in response to the generation of said first signal, step (d) being carried out between steps (b) and (c).

15. A method according to claim 13, wherein said engine further includes a fuel pump for controllably supplying fuel to the engine and wherein said method further comprises the step (d) of starting said fuel pump in response to detecting that said first prescribed data has been stored, step (d) being carried out between steps (b) and (c).

16. A method according to claim 13, wherein said method further includes the steps of (d) causing processor-generated initial digital engine control data to be provided in accordance with signals procuded by said sensor means; and (e) coupling said initial engine control data to said first means of said input/output means;

steps (d) and (e) being carried out prior to step (a).

17. A method according to claim 16, wherein said first means comprises first storage means for storing first processor-generated data representative of the state of operation of said input/output means, and second means, coupled to said storage means, for controlling the delivery of said control signals in dependence upon the first data stored by said first storage means, and wherein said method further includes the steps of (f) coupling said first processor-generated data to said first storage means subsequent to step (e); and (g) changing said first data stored in said first storage means in response to step (c) detecting the stopping condition of said energy conversion function and thereby causing said second means to terminate the delivery of said control signals.

18. A method according to claim 16, wherein said method further comprises the steps of (f) converting signals produced by said sensor means into digital form for delivery to said processor; and (g) generating an interrupt signal to be coupled to said processor representative of the conversion of said signals into digital form and for enabling delivery of digital signals to said processor.

19. A method according to claim 18, wherein said method further comprises the step of (h) inhibiting the generation of an interrupt signal in response to completion of delivery of said digital signals to said processor.

20. A metnod according to claim 13, wherein said intput/output unit further includes second means for producing a starter signal representative of the state of said switching means, and wherein said method further comprises the step of (d) defining the occurrence of said starter signal in dependence upon the storage of said first prescribed data, and the state of said switching means.

21. A method according to claim 20, wherein said input/output unit further includes means for providing an indication of an engine alarm condition and wherein said starter signal is selectively coupled to operate said engine alarm condition indication means in accordance with step (d).

22. A method of operating an electronic control apparatus for controlling the operation of a combustion engine, said engine including an output shaft driven by mechanical energy converted from heat energy caused by the combustion of fuel, and at least one means controlling energy conversion and engine starting means, said engine starting means including switching means having first and second states, and, during the second state of the switching means, said engine being started by a starter motor, and electronic control apparatus including a plurality of sensors, input/output means adapted to receive signals from said sensors and to deliver control signals to said energy conversion controlling means, and control circuit means, coupled to said input/output means, for producing engine control data in accordance with the signals generated by the sensors, said input/output means including first means for generating said control signals in accordance with engine control data produced by the control circuit means, and second means for producing a starter signal representative of the state of said switching means;

said method comprising the steps of:

(a) detecting a change to the first state from the second state of said switching means in accordance with the starter signal produced by the second means of the input/output means; and (b) starting, in accordance with step (a), an operation for detecting the condition of the stopping of said energy conversion of the engine so as to return said first means of said input/output means to prescribed initial condition in response to the stopping of said energy conversion.

23. A method for controlling an internal combustion engine according to claim 22, further including the steps of:

(c) generating initial digital engine control data for starting the energy conversion of the engine on the basis of sensed signals, and (d) delivering said initial digital engine control data to the first means of the input/output means, said steps (a) and (b) being performed after steps (c) and (d), and said step (b) including a step of starting an operation of the step (c) in accordance with the detection of the stop condition of the energy conversion.

24. A method for controlling an internal combustion engine according to claim 23, further including the steps of:

(e) detecting a change to the second state from the first state of said switching means in accordance with the starter signal produced by the second means of the input/output means; and (f) starting, in accordance with step (e) an operation for delivering to the energy conversion controlling means aid control signals being produced in accordance with the initial digital engine control data, said steps (a) and (b) being performed after steps (e) and (f).

* * * * *